United States Patent
Foo et al.

[19]

[11] Patent Number: 6,036,225
[45] Date of Patent: Mar. 14, 2000

[54] METHOD AND APPARATUS FOR CONTROLLING AN ACTUATABLE RESTRAINT DEVICE USING CRASH SEVERITY INDEXING

[75] Inventors: Chek-Peng Foo, Ann Arbor; Huahn Fern Yeh, Novi; Paul Leo Sumner, Farmington Hills; Timothy Chester Wright, Ann Arbor, all of Mich.; Shiyi Jia, Herndon, Va.; Scott Andrew William Martin, Pontiac, Mich.

[73] Assignee: TRW Inc., Lyndhurst, Ohio

[21] Appl. No.: 09/108,819

[22] Filed: Jul. 1, 1998

[51] Int. Cl.$^7$ ................................................ B60R 21/32
[52] U.S. Cl. ............................................ 280/735; 701/45
[58] Field of Search ................................ 280/735; 701/45

[56] References Cited

U.S. PATENT DOCUMENTS

| | | | |
|---|---|---|---|
| 3,966,224 | 6/1976 | Campbeil et al. | 280/735 |
| 4,021,057 | 5/1977 | Held et al. | 280/735 |
| 5,187,465 | 2/1993 | Stonerook et al. | 340/438 |
| 5,400,487 | 3/1995 | Gioutsos et al. | 280/735 |
| 5,411,289 | 5/1995 | Smith et al. | 280/735 |
| 5,497,327 | 3/1996 | Takaya et al. | 364/424.05 |
| 5,559,697 | 9/1996 | Wang | 280/735 |
| 5,587,906 | 12/1996 | McIver et al. | 701/36 |
| 5,746,444 | 5/1998 | Foo et al. | 280/735 |
| 5,758,899 | 6/1998 | Foo et al. | 280/735 |
| 5,785,347 | 7/1998 | Adolph et al. | 280/735 |
| 5,935,182 | 8/1999 | Foo et al. | 701/45 |
| 5,983,148 | 11/1999 | Bigi et al. | 701/45 |

FOREIGN PATENT DOCUMENTS

| | | |
|---|---|---|
| 0798175A2 | 10/1997 | European Pat. Off. . |
| 0823356A1 | 2/1998 | European Pat. Off. . |
| 0829398A1 | 3/1998 | European Pat. Off. . |
| 2005887 | 4/1979 | United Kingdom . |
| 2263571 | 7/1993 | United Kingdom . |

OTHER PUBLICATIONS

Copy of Great Britain Search Report.

*Primary Examiner*—Kenneth R. Rice
*Attorney, Agent, or Firm*—Tarolli, Sundheim, Covell, Tummino & Szabo L.L.P.

[57] ABSTRACT

An apparatus for controlling an actuatable occupant restraint device for a vehicle, the restraining device having a plurality of actuatable stages (24, 26), the apparatus including a crash sensor (14, 16) for sensing crash acceleration and providing a crash acceleration signal indicative thereof. A controller (22) includes an integrator (72, 172) for determining a velocity value from the crash acceleration signal and for providing a velocity signal (74, 174). The controller (22) is coupled to the actuatable device for (i) effecting actuation of a first of the actuatable stages (24) when the determined velocity value exceeds a first threshold value, and (ii) upon the determined velocity value exceeding a second threshold value, determining a crash severity index (112, 212) having a value related to a time interval from when the determined velocity value (74, 174) exceeds the first threshold value (88, 188) to when the determined velocity value exceeds the second threshold value (96, 196). The controller effects actuation of a second of the actuatable stages (26) in response to the crash severity index value (112, 212).

33 Claims, 13 Drawing Sheets

| EVENT | UNBELTED | BELTED |
|---|---|---|
| 40KPH-0-DEG-BARRIER | 20ms DELAY | PRIMARY STAGE ONLY |
| 40KPH-ODB | PRIMARY STAGE ONLY | NF |
| 48KPH-0-DEG-BARRIER | 5ms DELAY | 20ms DELAY |
| 48KPH-30-DEG-OBLIQUE | 20ms DELAY | PRIMARY STAGE ONLY |
| 48KPH-0-DEG-POLE | 20ms DELAY | 20ms DELAY |
| 56KPH-0-DEG-BARRIER | 5ms DELAY | 5ms DELAY |
| 56KPH-ODB | 20ms DELAY | PRIMARY STAGE ONLY |
| 64KPH-ODB | 5ms DELAY | 20ms DELAY |

Fig.7

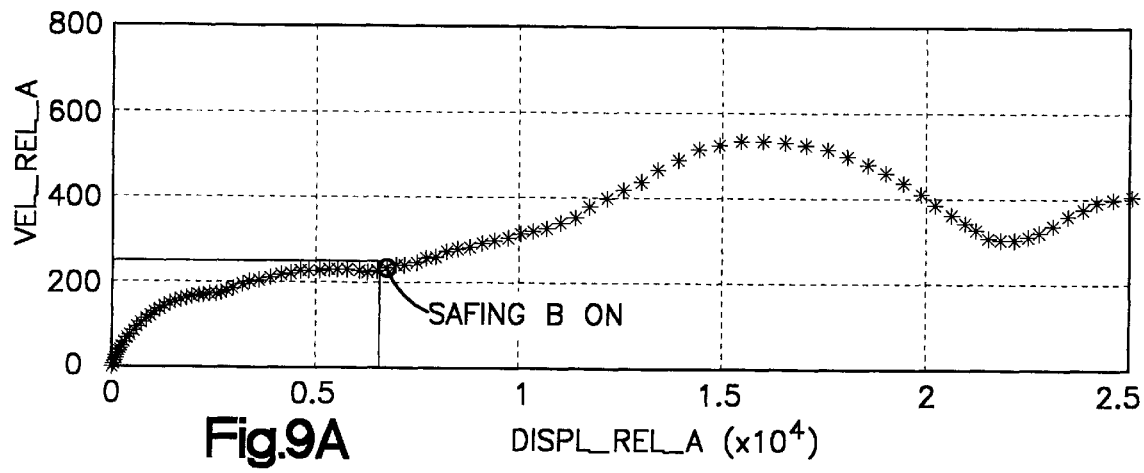
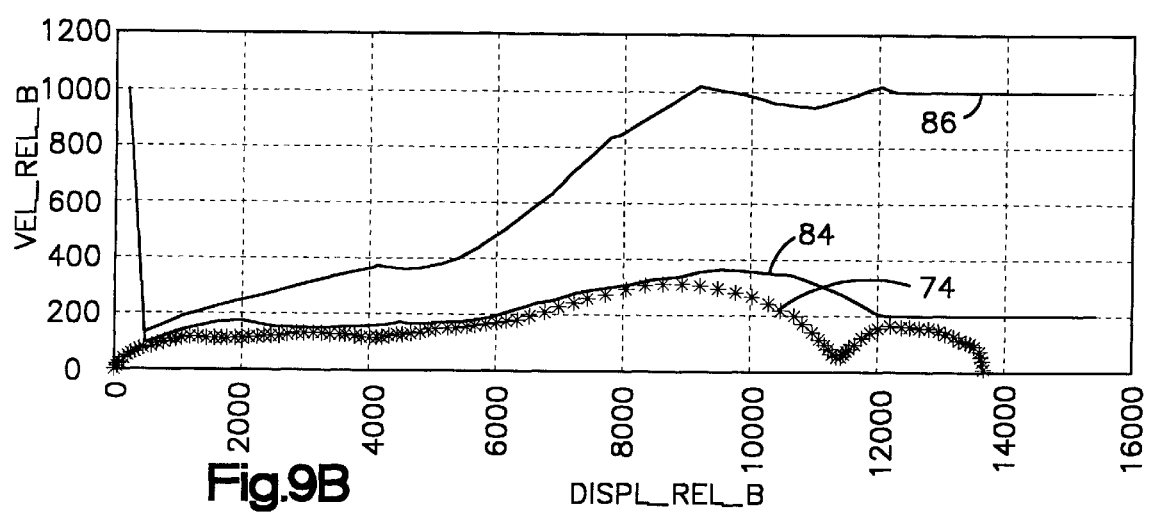

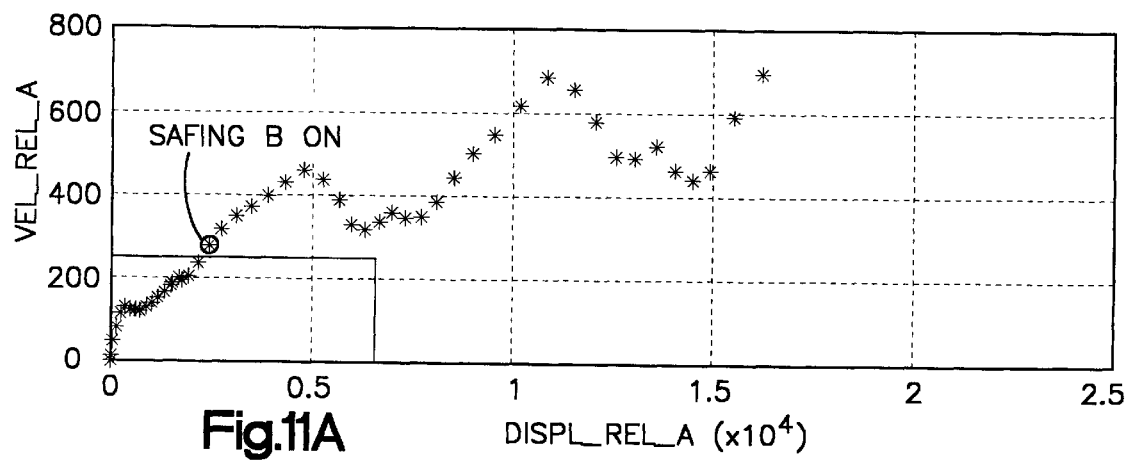
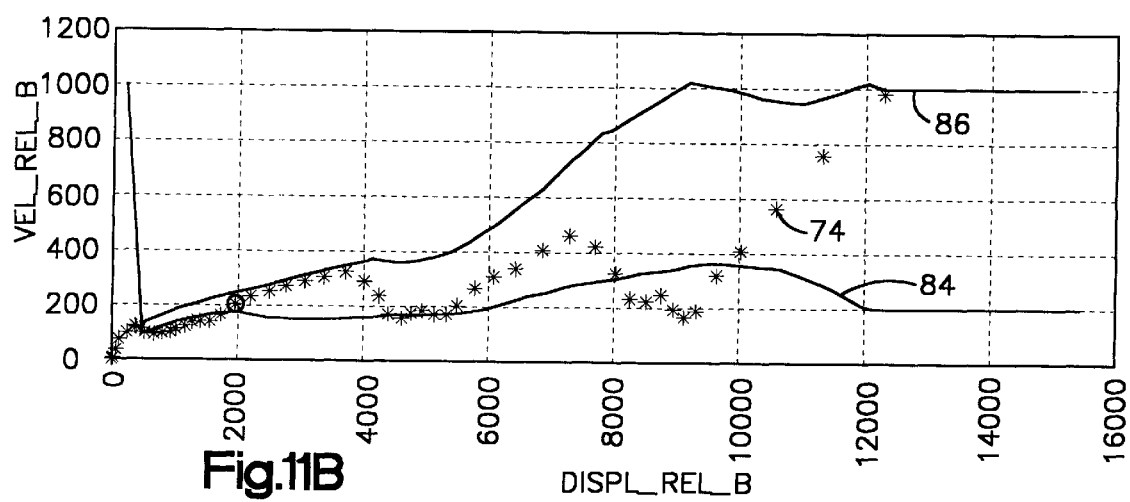

METHOD AND APPARATUS FOR CONTROLLING AN ACTUATABLE RESTRAINT DEVICE USING CRASH SEVERITY INDEXING

FIELD OF THE INVENTION

The present invention relates to an apparatus and method for controlling an actuatable occupant restraint device for a vehicle. More particularly, the present invention relates to a method and apparatus for controlling an actuatable occupant restraint device having a plurality of actuatable stages.

BACKGROUND OF THE INVENTION

Actuatable occupant restraint systems, such as air bags, for vehicles are well known in the art. Such restraint systems include one or more collision sensing devices for sensing vehicle crash acceleration (vehicle deceleration). Air bag restraint systems further include an electrically actuatable igniter, referred to as a squib. When the collision sensing device senses a deployment crash event, an electrical current of sufficient magnitude and duration is passed through the squib to ignite the squib. When ignited, the squib initiates the flow of inflation fluid into an air bag from a source of inflation fluid, as is known in the art.

Certain known collision sensing devices used in actuatable occupant restraint systems are mechanical in nature. Still other known actuatable occupant restraint systems for vehicles include an electrical transducer, such as an accelerometer, for sensing vehicle crash acceleration. Systems using an accelerometer as a crash or collision sensor further include some circuitry, e.g., a controller, for monitoring the output of the accelerometer. The accelerometer provides an electrical signal having an electrical characteristic indicative of the vehicle's crash acceleration. The accelerometer is operatively connected to a controller, such as a microcomputer, which performs a crash algorithm on the acceleration signal for the purpose of discriminating between a deployment and a non-deployment crash event. When a deployment crash event is determined to be occurring, the restraint is actuated, e.g., an air bag is deployed.

One particular type of occupant restraint system known in the art is a multi-stage occupant restraint system that includes more than one actuatable stage associated with a single air bag. In a multi-stage air bag restraint system, air bag inflation is the result of the control of a multi-stage inflator. Such multi-stage air bag systems typically have two or more separate sources of inflation fluid controlled by actuation of associated squibs. Known control arrangements control the actuation of the multiple stages based on a timer function. A problem arises in monitoring for a beginning of the crash event to start the timer. False starts (and endings) could occur due to signals resulting from road noise.

U.S. Pat. No. 3,966,224 is directed to a multi-stage air bag restraint system having two squibs. Under certain types of crash conditions, a first stage is actuated followed by actuation of a second stage a predetermined time after actuation of the first stage. If the crash acceleration is greater than a predetermined level, both stages are simultaneously actuated.

U.S. Pat. No. 4,021,057 is directed to a multi-stage air bag restraint system having a plurality of firing elements for gas generators. Crash velocity is compared against a plurality of threshold values for control of the plurality of squibs and, in turn, control of the inflation rate of the air bag.

U.S. Pat. No. 5,400,487 is directed to an air bag restraint system having a plurality of separately controlled gas generators actuated at selected times in a selected order to control the air bag's inflation profile. The selective triggering is a function of both the crash type extrapolated from past received acceleration data and the occupant position based on received occupant position data.

U.S. Pat. No. 5,411,289 is directed to an air bag restraint system having a multiple level gas generation source. "The electronic control unit is responsive to a combination of sensed inputs from the temperature sensor, the seat belt sensor, and the acceleration sensor for determining both an optimum gas generation level and inflation sequence times for controlling the multiple level gas generation source." (Abstract of '289 patent)

Many types of crash algorithms for discriminating between deployment and non-deployment crash events are known in the art. Algorithms typically are adapted to detect particular types of crash events for particular vehicle platforms. One example of such an algorithm is taught in U.S. Pat. No. 5,587,906 to McIver et al. and assigned to TRW Inc.

Air bag restraint systems are also known to require more than one sensor for detection of a deployment crash event. Often, the plural sensors are arranged in a voting scheme in which all the sensors must "agree" that a deployment crash event is occurring before restraint actuation is initiated. In certain known arrangements having a first and second sensor, the second sensor is referred to as a "safing sensor." Air bag actuation occurs only if the first sensor and the safing sensor indicate a deployment crash event is occurring.

SUMMARY OF THE INVENTION

The present invention is directed to an apparatus for controlling an actuatable occupant restraint system for a vehicle, the restraining device having a plurality of actuatable stages. The apparatus includes crash sensing means for sensing crash acceleration and providing a crash acceleration signal indicative thereof. A velocity determining means, which is responsive to the crash acceleration signal, determines a velocity value and provides a velocity signal indicative thereof. Control means is coupled to the actuatable device for (i) effecting actuation of a first of the actuatable stages when the determined velocity value exceeds a first threshold value, and (ii) upon the determined velocity value exceeding a second threshold value, determining a crash severity index having a value related to a time interval for when the determined velocity value exceeds the first threshold value to when the determined velocity value exceeds a second threshold value. In response to the crash severity index value, the control means controls actuation of a second of the actuatable stages in response to the crash severity index value.

In accordance with another embodiment of the present invention, the apparatus further includes a switching device for providing a signal indicative of a belted or unbelted vehicle occupant condition. The control means further includes a plurality of selectable crash metrics responsive to the determined belted or unbelted occupant condition for controlling actuation of the actuatable occupant restraint device. Each of the crash metrics has associated first and second threshold values. In response to the switching device signal, the control means selects a crash metric, the selected crash metric controlling actuation of the plurality of stages.

In accordance with another aspect of the present invention, a method is provided for controlling actuation of an actuatable occupant restraint device having a plurality of stages. The method comprises the steps of sensing crash acceleration and providing a crash acceleration signal indicative thereof. A velocity value is determined in response to the crash acceleration signal. Upon the determined velocity value exceeding a first variable threshold value, actuation of a first of the actuatable stages is effected. The method further includes the steps of determining a crash severity index having a value upon the determined velocity value exceeding a second variable threshold value. The crash severity index has a value according to a time interval from when the determined velocity value exceeded the first threshold value to when the determined velocity value exceeds a second threshold value. In response to the crash severity index value, actuation of a second of the actuatable stages is effected.

BRIEF DESCRIPTION OF THE DRAWINGS

The foregoing and other features and advantages of the invention will become more apparent to one skilled in the art upon consideration of the following description of the invention and the accompanying drawings in which:

FIG. 7 is a chart showing the effects of different crash severity indexes in accordance with the present invention;

FIGS. 9A–14B are graphical representations of determined occupant velocity versus occupant displacement plots during various types of crash events.

DESCRIPTION OF PREFERRED EMBODIMENTS

Figure 1:
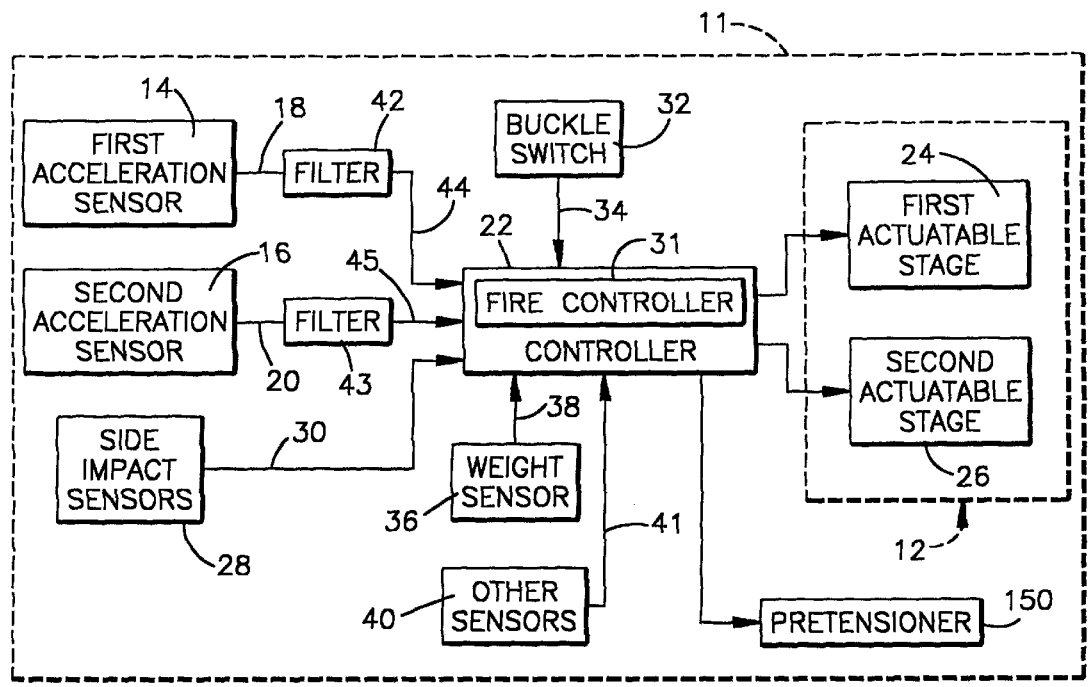
FIG. 1 is a schematic block diagram of an actuatable occupant restraint system in accordance with the present invention.

FIG. 1 illustrates an occupant restraint system 10, in accordance with the present invention, for use in a vehicle 11. The system 10 includes an actuatable restraint system 12, such as an air bag restraint system. Although, the restraint system 12 is shown and described as an air bag restraint system, the present invention is not limited to use with an air bag restraint system. The present invention is applicable to any actuatable restraining device having multiple actuatable stages or to a plurality of actuatable restraint devices that can be simultaneously or sequentially actuated. Only a single air bag having plural actuatable stages is described for simplicity of explanation. The invention is also applicable to a vehicle having multiple air bags wherein at least one of the air bags is a multi-stage air bag controlled in accordance with the present invention.

The system 10 includes at least one crash or collision sensor and preferably a plurality of crash acceleration sensors 14 and 16, each providing a crash acceleration signal 18, 20, respectively, having a characteristic indicative of sensed crash acceleration. These crash acceleration signals can take any of several forms known in the art. The crash acceleration signal can have an amplitude, frequency, pulse duration, etc. that varies as a function of the crash acceleration. In accordance with a preferred embodiment, the crash acceleration signals have frequency and amplitude components that are functionally related to the crash acceleration.

The crash acceleration signals 18 and 20 are provided to a controller 22, such as, for example, a microcomputer. Although the preferred embodiment of the invention uses a microcomputer, the invention is not limited to the use of a microcomputer. The present invention contemplates that the functions performed by the microcomputer could be carried out by discrete digital and/or analog circuitry and can be assembled on one or more circuit boards or as an application specific integrated circuit ("ASIC"). The crash acceleration signals 18 and 20 preferably are filtered by filters 42, 43, respectively, to remove frequency components that are not useful in discriminating a vehicle crash event, e.g., frequency components resulting from road noise. Frequencies useful for crash discrimination are determined through empirical testing.

The controller 22 monitors the filtered crash acceleration signals 44, 45 from filters 42, 43, respectively, and performs one or more preselected crash algorithms to discriminate whether a vehicle deployment or non-deployment crash event is occurring. Each crash algorithm measures and/or determines values of the crash event from the crash acceleration signals. These values are used for deployment decisions. Such measured and/or determined crash values are also referred to as "crash metrics" and include crash acceleration, crash energy, crash velocity, crash displacement, crash jerk, etc. Based upon the crash acceleration signals 44 and 45, in accordance with a preferred embodiment, the controller 22 further determines a crash severity index value for a crash event using a crash severity metric (described below) and uses this determined crash severity index value in the control of the multiple actuatable stages of the actuatable restraint 12.

In the preferred embodiment shown in FIG. 1, the air bag restraint system 12 includes a first actuatable stage 24 and a second actuatable stage 26, e.g., two separate sources of inflation fluid in fluid communication with a single air bag restraint 12. Each stage 24, 26, has an associated squib (not shown) that, when energized with sufficient current for a sufficient time period, initiates fluid flow from an associated fluid source. When one stage is actuated, a percentage less than 100% inflation occurs. To achieve a 100% inflation, the second stage must be actuated within a predetermined time of the first stage actuation.

More specifically, the controller 22 performs a crash algorithm using the crash metrics and outputs one or more signals to the actuatable restraint device 12 for effecting actuation of one or both actuatable inflation stages 24 and 26. As mentioned, in accordance with one preferred embodiment of the present invention, the actuatable device 12 is an air bag module having first and second actuatable stages 24 and 26, respectively. Each of the actuatable stages includes an associated squib of the type well known in the art. Each squib is operatively connected to an associated source of gas generating material and/or a bottle of pressurized gas. The squibs are ignited by passing a predetermined amount of electrical current through them for a predetermined time period. The squib ignites the gas generating material and/or pierces the pressurized gas bottle, thereby inflating the restraint device 12. The amount of gas released into the bag is a direct function of the number of stages actuated and the timing of their actuation. The more stages actuated during predetermined time periods, the more gas released into the bag. In accordance with an embodiment, the air bag has two stages. If only one stage is actuated, 40% inflation occurs. If the stages are actuated within 5 msec. of each other, 100% inflation occurs. If the stages are actuated approximately 20 msec. apart, a different percentage inflation occurs. By controlling the actuation timing of the multiple stages, the dynamic profile of the bag is controlled, e.g., the inflation rate, the amount of inflation, etc.

In accordance with the present invention, a fire controller 31 within the controller 22 controls the actuation of the first and second actuatable stages 24 and 26 using determined crash metrics. In accordance with a preferred embodiment of the present invention, several factors in addition to determined crash metrics influence the actuation of the stages of the actuatable restraint device 12. Such additional factors include (i) the occurrence of a side impact event as determined from a signal 30 from side impact sensors 28, (ii) the state of a seat belt buckle as determined from a signal 34 from a buckle switch 32, and/or (iii) occupant weight as determined from a signal 38 from an occupant weight sensor 36. In addition to the sensors 28, 32, and 36, the system 10 may also include other sensors 40 that provide signals 41 indicative of yet another occupant condition and/or vehicle condition that might be useful in control of the actuatable restraint 12. For example, the other sensors 40 could include a vehicle roll-over sensor, a sensor for detecting the height, size, and/or girth of a vehicle occupant, an occupant position sensor, etc.

As mentioned, the system, in accordance with a preferred embodiment of the present invention, includes two acceleration sensor 14, 16. The first acceleration sensor 14 is used to determine crash metric values associated with a buckled vehicle occupant. The second acceleration sensor 16 is used to determine crash metric values associate with an unbuckled vehicle occupant.

Figure 2:
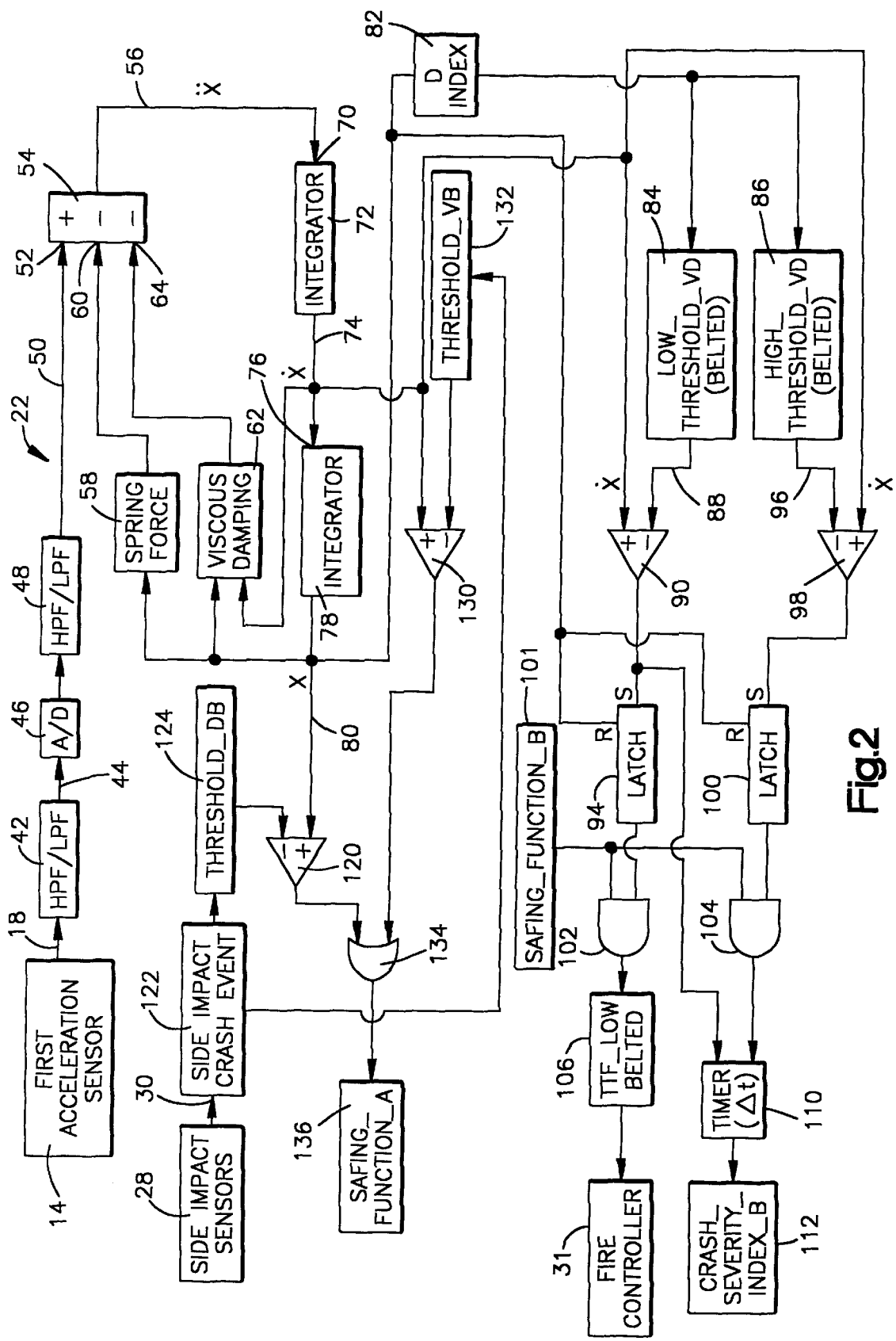
FIG. 2 is a functional block diagram of a portion of the system of FIG. 1.

Referring to FIG. 2, a functional block diagram schematically represents certain of the control functions performed by the controller 22 on the signals from the first acceleration sensor 14 and the side impact sensors 28. Specifically the block elements (except for the sensors 14, 28 and filter 42) correspond with functional operations performed by the controller 22. Preferably, as mentioned, the controller 22 is a microcomputer programmed to perform these illustrated functions. Those skilled in the art will appreciate that the functions could be alternatively performed with discrete circuitry, an application specific integrated circuit ("ASIC"), or a combination of integrated circuits. The description of "functions" performed by controller 22 may also be referred to herein as "circuits". For example, a summing function may be referred to as a summing circuit interchangeably.

The first acceleration sensor 14, preferably an accelerometer, outputs a first acceleration signal 18 having a characteristic (e.g., frequency and amplitude) indicative of the vehicle's crash acceleration upon the occurrence of a crash event. The acceleration signal 18 preferably is filtered by, preferably, a hardware (i.e., separate from the controller 22) high-pass-filter ("HPF")/low pass filter ("LPF") 42 to eliminate frequencies resulting from extraneous vehicle operating events and/or input signals resulting from road noise. The frequency components removed through filtering are not indicative of the occurrence of a crash event for which deployment of the restraint 12 is desired. Empirical testing is used to determine the frequency values of relevant crash signals. Extraneous signal components that may be present in the crash acceleration signal are appropriately filtered and frequencies indicative of a deployment crash event are passed for further processing.

The first accelerometer 14 preferably has a predetermined sensitivity of at least about +/−80 g (g being the value of acceleration due to earth's gravity, i.e., 32 feet per second squared or 9.8 m/s$^2$). In a multi-stage actuatable restraint system, it is desirable to continue sensing crash acceleration during the crash event, even after a first or initial trigger value is reached. Since a first stage actuation is desired upon the occurrence of a crash acceleration well below 80 g's, the further need for sensing is facilitated with the accelerometer 14 having a sensitivity of at least about +/−80 g, and preferably from +/−80 g to about +/−100 g.

The filtered output signal 44 is provided to an analog-to-digital (converter) 46, which is preferably internal to the controller 22 (e.g., an A/D input of a microcomputer) or an external A/D converter. The A/D converter 46 converts the filtered crash acceleration signal 44 into a digital signal. The output of the A/D converter 46 is filtered preferably with another high-pass/low-pass filter 48 having filter values empirically determined for the purpose of eliminating small drifts and offsets as well as to further reduce extraneous signal noise not useful in discriminating a crash event. In a microcomputer embodiment of the present invention, the filter 48 would be digitally implemented within the microcomputer. The filtering function 48 outputs a filtered acceleration signal 50 to a positive input 52 of a summing function 54.

In the preferred embodiment of the present invention, crash severity index values (described below in detail) for both a belted occupant condition ("crash severity index B") and for an unbelted occupant condition ("crash severity index A") are determined through processing of the crash acceleration signals using an occupant spring-mass model. The spring-mass model provides an adjusted crash acceleration signal that is adjusted for spring force and viscous damping.

In the signal processing for the belted occupant condition shown in FIG. 2, the spring-mass model is used to provide an adjusted crash acceleration signal 56 output from the summing function 54. The adjusted acceleration signal 56 is used to discriminate between deployment and non-deployment crash events. When the vehicle is subjected to a crash condition from a direction having a front-to-aft component, the resulting crash acceleration experienced by the vehicle is considered to be the driving function which gives an initial pulse to the occupant spring-mass model. A spring force, which is a function of displacement, is a force on the occupant that results from the seat belt system. A damping force, which is a function of both determined velocity and determined displacement, is a force providing a frictional effect on the occupant resulting from the seat belt system. That is to say, the friction resulting from the seat belt stretching due to occupant loading during a vehicle crash condition defines the damping force. A detailed explanation of a spring-mass model is found in U.S. patent application Ser. No. 08/719,082 to Foo et al. and assigned to TRW Inc., and is hereby fully incorporated herein by reference.

Figure 3:
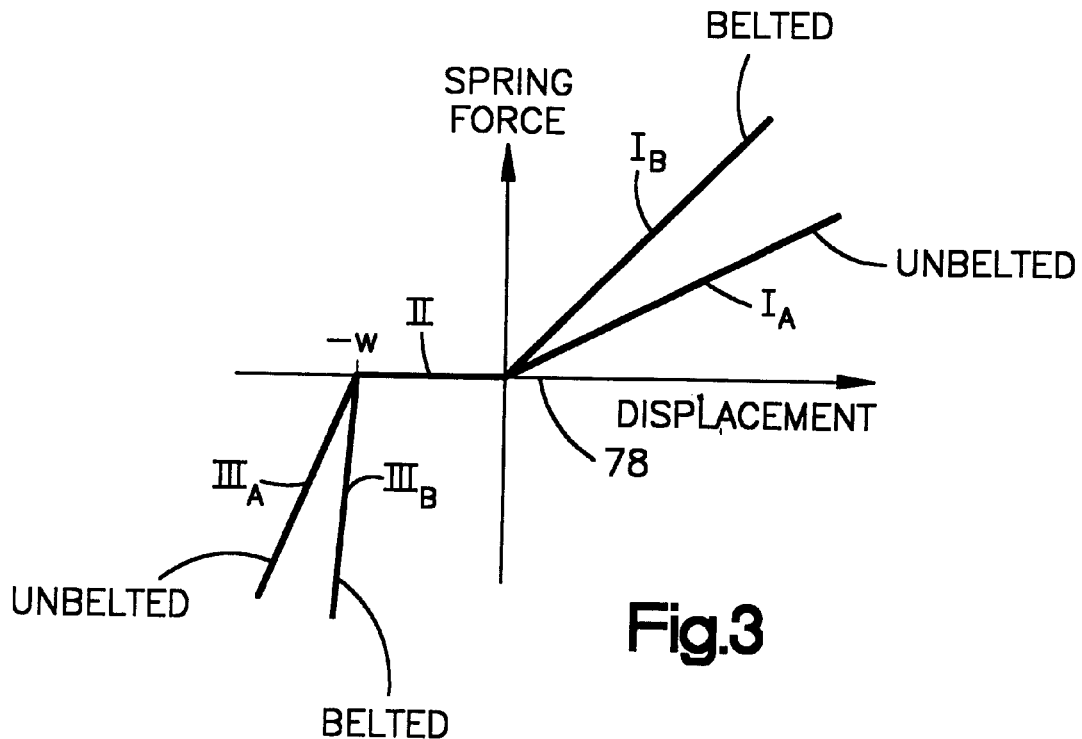
FIG. 3 is a graphical representation of spring force of an occupant as a function of occupant displacement for use with the spring-mass model of the present invention.

Referring to FIG. 3, generalized values of spring force as a function of displacement for both an unbelted and belted occupant condition is shown. Although, two different spring force values are shown, i.e., one for a belted occupant and one for an unbelted occupant, it is possible to use a single set of spring force verses displacement values for both belted and unbelted conditions. The spring force versus displacement is divided into three regions. While different values can be used, it has been found that the ratio of the slope of the values in region III to region I being 3/1 provides satisfactory results.

Figure 4:
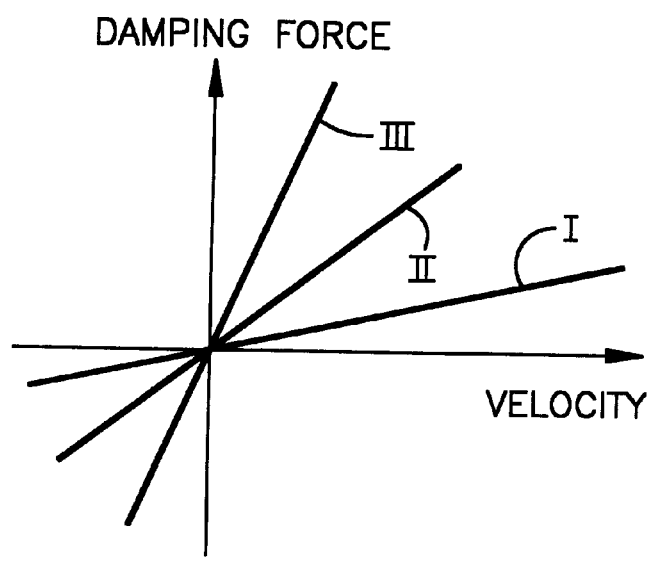
FIG. 4 is a graphical representation of damping force of an occupant as a function of occupant velocity for use with the spring-mass model of the present invention.

Referring to FIG. 4, generalized values of damping force as a function of velocity is shown corresponding to the three different displacement regions of FIG. 3. Although values for three distinct regions are shown, those skilled in the art will appreciate that the damping values could be calculated using a functional relationship so that the damping values are functionally related to both determined velocity and determined displacement. In accordance with one embodiment of the present invention, the same damping force values are used for both the occupant belted and unbelted conditions. Of course, different damping values for belted and unbelted conditions could be used to achieve a desired crash discrimination.

Specific values for the spring force function 58 and values for the damping function 62 are empirically determined to provide the desired crash discrimination for a particular vehicle platform and may incorporate other parameters, such as occupant weight, as sensed from the occupant weight sensor 36, and/or any other sensed occupant characteristic. The spring force function 58 outputs a spring force value (see FIG. 3) as a function of determined displacement to a negative input 60 of the summing function 54. The damping function 62 outputs a damping value (see FIG. 4) as a function of determined velocity for a determined displacement region to a negative input 64 of the summing function 54. The output 56 of the summing function 54 is an "adjusted acceleration signal" that has been modified in response to the occupant spring-mass model to more nearly represent the acceleration of the belted vehicle occupant. Initially, the values of the spring force function 58 and the viscous damping function 62 are set to zero. Their values change in response to a continuous determination of a velocity value and a displacement value from the adjusted acceleration signal.

The adjusted acceleration signal 56 is applied to an input 70 of an integrator function 72. An output 74 of the integrator function 72 is a signal indicative of a velocity value determined from the adjusted acceleration value 56. The velocity value 74 is referred to herein as the "virtual occupant velocity" arising from adjusted acceleration 56.

The velocity value 74 is applied to an input 76 of a second integrator function 78 and to the input of the viscous damping function 62. The output 80 of the second integrator 78 is a displacement value based on the adjusted acceleration signal 56. The displacement value 80 is referred to herein as the "virtual occupant displacement" arising from the adjusted acceleration 56.

The displacement value 80 is applied to both the spring force function 58 and to the viscous damping function 62. The velocity value 74 from the integrator 72 is applied to the viscous damping function 62. In the preferred embodiment of the present invention, the spring force values, which are a function of displacement, and the viscous damping values, which are a function of velocity for a particular displacement range, may be stored in a look-up table or may be calculated. In an analog embodiment of the present invention, conventional circuit network techniques may be employed to fabricate functional blocks having desired transfer characteristics.

The determined value of the displacement 80 is output to a displacement indexing function 82 ("D_INDEX"). The indexing function 82 categorizes the determined displacement value 80 into one of a plurality of possible discrete range of values that are used to index threshold values 84 and 86 as a function of particular displacement range within which the displacement value 80 falls. In the embodiment shown in FIG. 2, the displacement threshold determining function 84 ("LOW_THRESHOLD_VD (BELTED)") corresponds to a low variable threshold value. This low variable threshold varies in a stepwise fashion (due to the index function 82) as a function of the normalized displacement value 80 for a belted vehicle occupant. The functional relationship between the threshold value 88 and determined normalized displacement value 80 is empirically determined for a particular vehicle platform of interest so as to achieve desired crash discrimination. In this embodiment, the LOW_THRESHOLD_VD (BELTED) values 84 are determined for a belted vehicle occupant through empirical methods and are intended to control the first actuatable stage 24 of the actuatable restraint 12. The low threshold values must be set high enough so as to protect against inadvertent firing for predetermined types of non-deployment crash events.

The determined velocity value 74 is supplied to one input of a comparator function 90. The output 88 of the LOW_THRESHOLD_VD function 84 is supplied to the other input of the comparator 90. The comparator 90 determines whether the occupant's virtual velocity value 74 is greater than the displacement-dependent threshold value 88 for a belted occupant. If the determination is affirmative, a digital HIGH (i.e., a TRUE) is output to a set input of a latch circuit 94, which latches the HIGH or TRUE state of the output of the latch circuit 94.

The output of the indexing function 82 is also supplied to a high threshold determining function 86 ("HIGH_THRESHOLD_VD (BELTED)"). The high threshold determining function 86 is similar to the low threshold determining function 84 in that it provides a relative velocity threshold that varies in a stepwise fashion (due to the indexing function 82) as a function of the normalized displacement value 80. Again, the functional relationship between the high threshold determining function 86 and the normalized velocity value 74 is determined empirically for a particular vehicle platform to achieve desired crash discrimination.

In general, the high threshold 86 is defined by medium speed barrier events. This threshold value is adjusted downwardly, if necessary, for a particular vehicle platform to provide maximum air bag inflation during predetermined high severity crash events. The output 96 of the HIGH threshold determining function 86 is supplied to one input of a comparator function 98. The comparator function 98 includes another input connected to the determined velocity value 74. The comparator 98 provides a HIGH (i.e., TRUE) output when the determined velocity value 74 is greater than the displacement-dependent high variable threshold value 96. The output of comparator 98 is connected to a set input of a latch circuit 100, which latches the occurrence of a HIGH or TRUE condition at the output of the latch circuit 100.

Each of the latch circuits 94, 100 have their associated reset inputs ("R") connected to the virtual determined displacement output 80 of the integrator 78. If the value of the occupant virtual displacement value 80 drops below a predetermined value, the latches 94, 100 are reset. When the latches 94, 100 are reset, they provide a digital LOW (i.e., NOT TRUE) at their output.

The output of latch 94 is connected to one input of an AND function 102. The output of the latch 100 is connected to one input of an AND function 104. The other inputs of the AND functions 102, 104 are connected to a safing B function 101. The safing B function 101 is described below.

Assuming for now, for the purposes of explanation, that the output of the safing B function 101 is HIGH (i.e., the safing function B is ON or TRUE), and the determined virtual velocity value 74 is greater than the LOW_THRESHOLD_VD (BELTED) value 84, then the output of the AND function 102 would be HIGH establishing a TTF_LOW BELTED TRUE condition 106. The effect of this occurrence is described below. The output TTF_LOW BELTED 106 is connected to the fire controller 31.

The output of the comparator 90 is connected to a timer function 110. The timing function 110 begins timing out when the LOW_THRESHOLD_VD (BELTED) value 88 is exceeded by the determined velocity value 74. The output of the AND function 104 is also connected to the timer function 110. When the value of the velocity value 74 exceeds the HIGH_THRESHOLD_VD (BELTED) value 86, the HIGH from AND function 104 serves to stop the timer function 110 from timing out further. The timer function 110 outputs a value indicative of the elapsed time starting from when the first threshold 84 was exceeded to the time the second threshold 86 was exceeded. This output of the timer function 110 is connected to a CRASH_SEVERITY_INDEX_B (belted) function 112.

The CRASH_SEVERITY_INDEX_B has a value functionally related to the time interval from when the determined velocity value 74 exceeds the first variable threshold value 88 to when the determined velocity value 74 exceeds the second variable threshold value 96. That is to say, a crash severity index B value 112 is functionally related to the amount of time from when comparator 90 first goes HIGH to when the comparator 98 goes HIGH (again, assuming SAFING FUNCTION B is ON). This time period from when the determined velocity value 74 exceeds the low threshold value 84 to when it exceeds the high threshold value 86 will be referred to herein as the "Δt measure". This value is a measure of the crash intensity. The shorter the time period, the more intense the vehicle crash. It is this measure of Δt that is used in the control of the second stage in accordance with the present invention.

The determined displacement value 80 is applied to an input of a comparator function 120. The side impact sensors 28 provides a side impact crash signal 30 having a value (e.g., frequency and/or amplitude) indicative of a side impact crash event to the controller 22. The controller monitors the side impact crash signal and establishes a side impact value (e.g., velocity and displacement) in a side impact crash event function 122. An established value (e.g., displacement) of the side impact crash event is applied to a variable displacement threshold determining function 124 ("THRESHOLD_DB"), which is a displacement based variable threshold function for the safing function of an unbelted vehicle occupant. The displacement threshold determining function 124 provides a threshold value functionally related to the value from side impact crash event function 122. In the absence of a side impact event, the displacement threshold determining function 124 outputs a minimum threshold value. The output of the threshold determining function 124 is connected to the other input of the comparator 120. The comparator 120 determines if the determined displacement value 80 is greater than the THRESHOLD_DB value. Comparator 120 outputs a HIGH when the determined displacement value 80 is greater than the side-impact-dependent threshold value output from 124.

The determined velocity value 74 is supplied to an input of a comparator function 130. The comparator function 130 compares the velocity value 74 with a value from velocity threshold determining function 132 ("THRESHOLD_VB"), which is a velocity based variable threshold function for the safing function of an unbelted vehicle occupant. The velocity threshold determining function 132 is connected to the side impact crash event function 122. The threshold function 132 outputs a threshold value that varies as a function of the signal value indicative of the side impact crash event. Accordingly, the velocity determining threshold value output from function 132 varies according to a measure of the side impact crash event as determined in function 122. The comparator function 130 provides a HIGH output if the determined velocity value 74 is greater than the velocity threshold value from function 132.

The outputs of comparator function 120 and comparator function 130 are applied to associated inputs of an OR function 134 to provide a safing function signal 136 ("SAFING_FUNCTION_A"). SAFING_FUNCTION_A is "ON" or HIGH when either (i) the determined displacement value 80 exceeds the displacement threshold value from function 124 or (ii) the determined velocity value 74 exceeds the velocity threshold value from function 132.

As set forth in greater detail below, the SAFING_FUNCTION_A 136 is used in connection with another determination of the controller 22 for an unbelted occupant condition. In general, the safing function 136 operates as a control mechanism for enabling or disabling actuation of the first and second stages 24 and 26 as a result of the monitoring of the second acceleration sensor 16 in accordance with FIG. 5 described below.

The output of the TTF_LOW_BELTED 106 is connected to the fire controller 31. As soon as the fire controller receives a HIGH from TTF_LOW_BELTED 106, the first actuatable stage 24 is actuated for a belted occupant.

Figure 5:
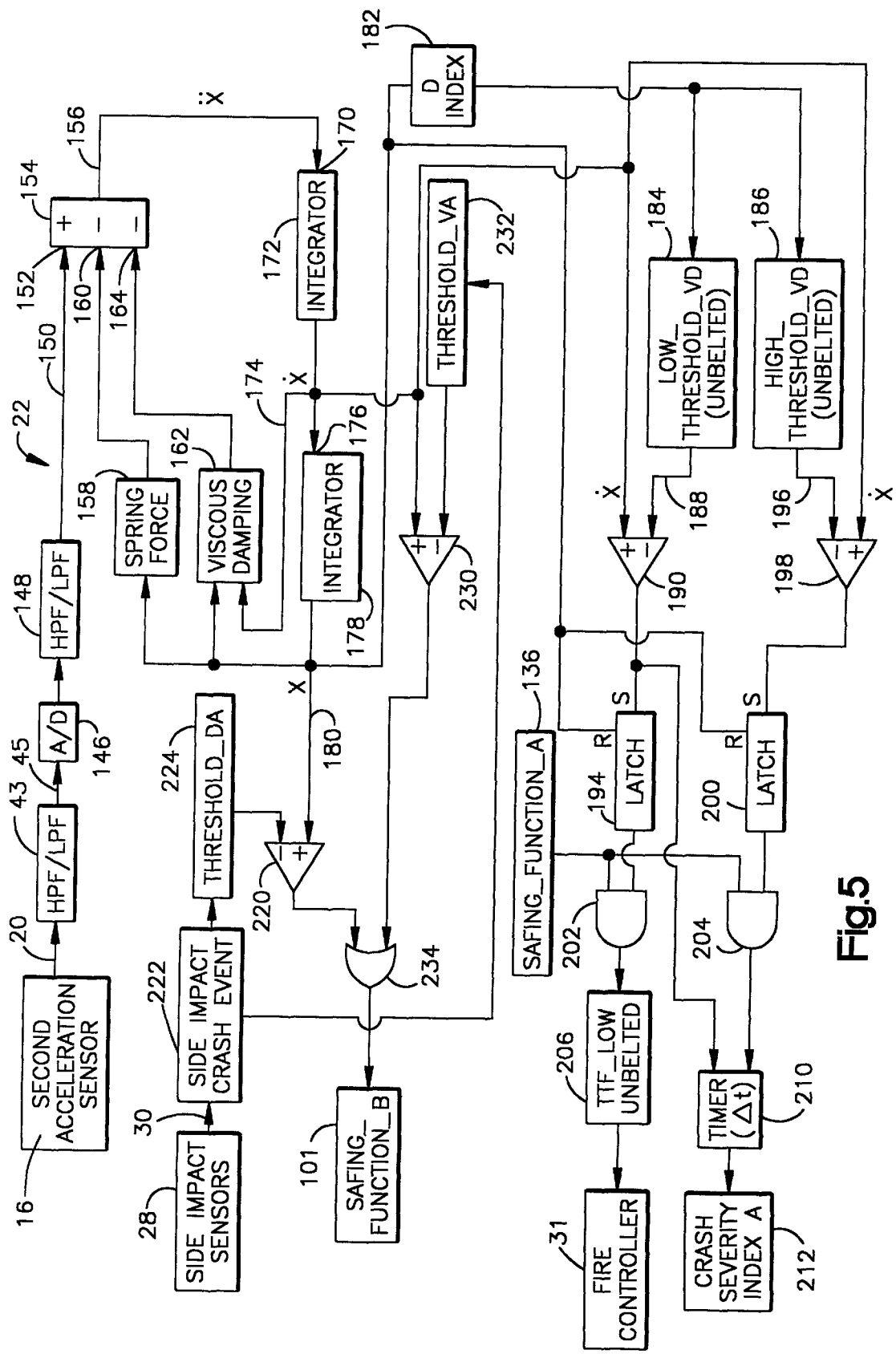
FIG. 5 is a functional block diagram of another portion of the system of FIG. 1.

Referring to FIG. 5, a functional block diagram schematically represents certain of the control functions performed by the controller 22 on the signals from the second acceleration sensor 16 and the side impact sensors 28 to provide a crash severity index A used for an unbelted occupant condition. Specifically the block elements (except for the sensors 16, 28 and filter 43 correspond with functional operations performed by the controller 22. Preferably, as mentioned, the controller 22 is a microcomputer programmed to perform these illustrated functions. Those skilled in the art will appreciate that the functions could alternatively be performed with discrete circuitry, an application specific integrated circuit ("ASIC"), or a combination of integrated circuits.

The second acceleration sensor 16, preferably an accelerometer, outputs an acceleration signal 20 having a characteristic (e.g., frequency and amplitude) indicative of the vehicle's crash acceleration upon the occurrence of a crash event. The acceleration signal 20 is filtered by, preferably, a hardware high-pass-filter ("HPF")/low pass filter ("LPF") 43 to eliminate frequencies resulting from extraneous vehicle operating events and/or inputs resulting from road noise. The frequency components removed through filtering are those frequencies not indicative of the occurrence of a crash event for which deployment of the restraint 12 is desired. Empirical testing is used to establish a frequency range or ranges of the relevant crash signals so that extraneous signal components present in the crash acceleration signal can be filtered and frequencies indicative of a deployment crash event passed for further processing.

The accelerometer 16 preferably has a sensitivity of at least about +/−80 g. As mentioned, it is desirable to continue sensing crash acceleration during the crash event for a multi-stage actuatable restraint system even after a first or initial trigger value is reached. Since a first stage actuation is desired upon the occurrence of a crash acceleration well below 80 g's, the further need for sensing is facilitated with the accelerometer 16 having a sensitivity of at least about +/−80 g, and preferably from +/−80 g to about +/−100 g.

The filtered output signal 45 is provided to an analog-to-digital (converter) 146, which may be internal to the controller 22 (e.g., an A/D input of a microcomputer) or an external A/D converter. The A/D converter 146 converts the filtered crash acceleration signal 45 into a digital signal. The output of the A/D converter 146 is filtered preferably with another high-pass/low-pass filter 148 having filter values empirically determined for the purpose of eliminating small drifts and offsets as well as to further reduce extraneous signal noise not useful in discriminating a crash event. In a microcomputer embodiment of the present invention, the filter 148 would be digitally implemented within the microcomputer. The filtering function 148 outputs a filtered acceleration signal 150 to a positive input 152 of a summing function 154.

As mentioned, in the preferred embodiment of the present invention, a crash severity index values for both a belted occupant condition (crash severity index B) and for an unbelted occupant condition (crash severity index A) are determined through processing of the crash acceleration signals 18, 20, respectively, using an occupant spring-mass model. The spring-mass model provides an adjusted crash acceleration signal that is adjusted for spring force and viscous damping.

In the signal processing for the unbelted occupant condition shown in FIG. 5, the spring-mass model is used to provide an adjusted crash acceleration signal 156 output from the summing function 154. The adjusted acceleration signal is used to discriminate between deployment and non-deployment crash events. When the vehicle is subjected to a crash condition from a direction having a front-to-aft component, the resulting crash acceleration experienced by the vehicle is considered to be the driving function which gives an initial pulse to the occupant spring-mass model. A spring force, which is a function of displacement, is a force on the occupant, which results from the seat belt system. A damping force, which is a function of both determined velocity and determined displacement, is a force providing a frictional effect on the occupant resulting from the seat belt system. That is to say, the friction resulting from the seat belt stretching due to occupant loading during a vehicle crash condition defines the damping force. A detailed explanation of a spring-mass model is found in the above incorporated U.S. patent application Ser. No. 08/719,082 to Foo et al. and assigned to TRW Inc.

Referring to FIG. 3, generalized values of spring force as a function of displacement for both an unbelted and belted occupant condition are shown. Although, two different spring force values are shown for the different occupant conditions, it is possible to use a single set of spring force verses displacement values. The spring force versus displacement graph is divided into three regions. While different values can be used, it has been found that having a slope of the values in region III to region I being 3/1 provides satisfactory results.

Referring to FIG. 4, generalized values of damping force as a function of velocity for the three different displacement regions (FIG. 3) are shown. It is contemplated that the same values will be used whether the occupant is belted or unbelted. Such damping effect is due to the occupant's weight on the seat, feet on the floor, etc. Of course, different values could be used to achieve a desired crash discrimination.

Specific values for the spring force function 158 and values for the damping function 162 are empirically determined to provide the desired crash discrimination for a particular vehicle platform and, as mentioned, may incorporate other parameters, such as occupant weight, as sensed from the occupant weight sensor 36, and/or any other sensed occupant characteristic. The spring force function 158 outputs a spring force value (see FIG. 3) as a function of determined displacement to a negative input 160 of the summing function 154. A viscous damping function 162 outputs a viscous damping value (see FIG. 4) as a function of determined velocity for a displacement region to a negative input 164 of the summing function 154. The output 156 of the summing function 154 is an adjusted acceleration signal that has been modified in response to the occupant spring-mass model to more nearly represent true acceleration of an unbelted vehicle occupant. Initially, the values of the spring force 158 and the viscous damping 162 are set to zero. Their values are changed continuously in response to a determination of velocity value and displacement value from the adjusted acceleration signal.

The adjusted acceleration signal 156 is applied to input 170 of an integrator function 172. An output 174 of the integrator function 172 is a signal indicative of a velocity value determined from the adjusted crash acceleration value. The determined velocity value may be referred to as the virtual occupant velocity arising from adjusted acceleration 156.

The determined velocity value 174 is applied to input 176 of a second integrator function 178. The output 180 of the second integrator 178 is a displacement value (x) based on the adjusted acceleration signal 156. The displacement value 180 is applied to the spring force function 158 and to the viscous damping function 162. The output 174 of the integrator 172 also is applied to the viscous damping function 162. In the preferred embodiment of the present invention, the spring force values, which are a function of displacement, and the viscous damping values, which are a function of velocity for a particular displacement range, may be conveniently stored in a lookup table or may be calculated. In an analog embodiment of the present invention, conventional circuit network techniques may be employed to fabricate a functional block having desired transfer characteristics. The velocity value 174 and displacement value 180 are referred to as the occupant's virtual velocity and displacement, respectively.

The determined value of the virtual displacement 180 is output to a displacement indexing function 182 ("D_INDEX"). The indexing function 182 categorizes the determined virtual displacement value 180 into one of several possible discrete value ranges that are used to index threshold value look-up tables 184 and 186. In the embodiment shown in FIG. 5, the displacement threshold determining function 184 ("LOW_THRESHOLD_VD (UNBELTED)") corresponds to a low variable threshold, which is a velocity based threshold that varies as a function of the normalized displacement value 180 for an unbelted vehicle occupant. The functional relationship between the threshold value 188 and determined normalized displacement value 180 is empirically determined for a particular vehicle platform of interest so as to provide for desired deployment characteristics of the actuatable restraint 12. In this embodiment, The LOW_THRESHOLD_VD (UNBELTED) function 184 is determined for an unbelted vehicle occupant and is intended to control the first actuatable stage 24 of the actuatable restraint 12.

The determined velocity value 174 is supplied to one input of a comparator function 190. The output 188 of the LOW_THRESHOLD_VD (UNBELTED) function 184 is supplied to the other input of the comparator 190. The comparator 190 determines if the virtual velocity value 174 is greater than the displacement-dependent variable threshold value 188. If the determination is affirmative, a digital HIGH is output to a set input of a latch circuit 194 which latches the HIGH or TRUE state at the output of the latch.

The output of the indexing function 182 is provided to a high threshold determining function 186 ("HIGH_THRESHOLD_VD (UNBELTED)"). The high threshold determining function 186 is similar to the low threshold determining function 184 in that it provides a relative velocity threshold that varies as a function of the normalized displacement value 180. Again, the functional relationship between the high threshold determining function 186 and the normalized velocity value 180 is determined empirically for a particular vehicle platform of interest.

In general, the high threshold 186 is defined by medium speed barrier events. This threshold value is adjusted downwardly, if necessary for a particular vehicle platform to provide for maximum full inflation during high severity crash events. The output 196 of the high threshold determining function 186 is supplied to an input of a comparator function 198. The comparator function 198 includes another input connected to the determined velocity value 174. The comparator 198 provides a HIGH output when the velocity value 174 is greater than the displacement-dependent high variable threshold value 196. The output of comparator 198 is connected to a set input of a latch circuit 200, which latches the occurrence of HIGH output from comparator function 198 at the output of the latch.

Each of the latch circuits 194, 200 have their associated reset inputs connected to the determined displacement output from the integrator 178. If the value of the determined displacement drops below a predetermined value, the latches are reset. When the latches 194, 200 are reset, their associated outputs would provide a digital LOW (i.e., NOT TRUE) at their output.

The output of latch 194 is connected to one input of an AND function 202. The output of the latch 200 is connected to one input of an AND function 204. The other inputs of the AND functions 202, 204 are connected to a safing function A 136 from FIG. 2. Assuming for now, for the purposes of explanation, that the safing function A is in a HIGH condition, and the determined velocity value 174 is greater than the LOW_THRESHOLD_VD value 188, then the output of 202 would go HIGH establishing a TTF_LOW UNBELTED (a TRUE) condition 206. The effect of this occurrence is described below. The output TTF_LOW UNBELTED 206 is connected to the fire controller 31.

The output of the comparator 190 is connected to the timer function 210. The timer function 210 begins timing out when the LOW_THRESHOLD_VD (UNBELTED) value 184 is exceeded by the determined velocity value 174. The output of the AND function 204 is also connected to the timer function 210. When the value of the velocity 174 exceeds the HIGH_THRESHOLD_VD (UNBELTED) value, the HIGH from 204 stops the timer function. The timer function 210 outputs a value Δt indicative of the elapsed time starting from when the first threshold 184 was exceeded to the time the second threshold 186 was exceeded. This output of the timer function 210 is connected to a CRASH_SEVERITY_INDEX_A (UNBELTED) function 212.

A crash severity index value CRASH_SEVERITY_INDEX_A has a value functionally related to a time interval from when the velocity value 174 exceeds the first variable threshold value 188 to when the velocity value 174 exceeds the second variable threshold value 196. That is to say, the timer function provides a Δt value to the crash severity index value 212 equal to the amount of time from when comparator 190 provides a HIGH signal to when the comparator 198 goes HIGH. This time period from when the velocity value 174 exceeds the low variable threshold value 188 to when it exceeds the variable value 196 is referred to herein as the "Δt measure" and this value is a measure of the crash intensity. The shorter the time period, the more intense the vehicle crash. It is this measure of Δt that is used in the control of the second stage in accordance with the present invention.

The determined displacement value 180 determined from the adjusted acceleration signal 156 is applied to an input of a comparator function 220. The side impact sensors 28 provides a side impact crash signal 30 having a value (frequency and/or amplitude) indicative of a side impact crash event to the controller 22. The controller monitors the side impact crash signal and establishes a side impact value (e.g., velocity and displacement) in a side impact crash event function 222. An established value (e.g., displacement) of the side impact crash event is applied to a variable displacement threshold determining function 224 ("THRESHOLD_DA"), which is a displacement based variable threshold function for the safing function of a belted vehicle occupant. The displacement threshold determining function 224 provides a threshold value functionally related to the value from side impact crash event function 222. In the absence of a side impact event, the displacement threshold determining function 224 provides a minimum value. The threshold determining function 224 outputs a threshold value to the other input of the comparator 220. The comparator 220 determines if the determined displacement value 180 is greater than the THRESHOLD_DA value. Comparator 220 outputs a HIGH where the determined displacement value 180 is greater than the side-impact-dependent threshold output from 224.

The determined velocity value 174 is supplied to an input of a comparator function 230. The comparator function 230 compares the determined velocity value 174 with a value from velocity threshold determining function 232 ("THRESHOLD_VA"), which is a velocity based variable threshold function for the safing function of a belted vehicle occupant. The velocity threshold determining function 232 is connected to the side impact crash event function 222 and its output varies as a function of the signal value indicative of the side impact crash event. Accordingly, the velocity determining threshold value from function 232 varies according to a measure of the side impact crash event from function 222. The comparator function 230 provides a HIGH output if the determined velocity value 174 is greater than the velocity threshold determining value from function 232.

The outputs of comparator function 220 and comparator function 230 are applied to the inputs of an OR function 234 to provide the SAFING_FUNCTION_B function 101 used in FIG. 2 and described above. SAFING_FUNCTION_B will thus be "ON" or HIGH or TRUE when either the determined displacement value 180 exceeds the displacement threshold value from function 224 or if the velocity value 174 exceeds the velocity threshold value from function 232.

The output of the TTF_LOW_UNBELTED 206 is connected to the fire controller 31. As soon as the fire controller receives a HIGH TTF_LOW_UNBELTED 206, the first actuatable stage 24 is actuated for an unbelted occupant.

Figure 6:
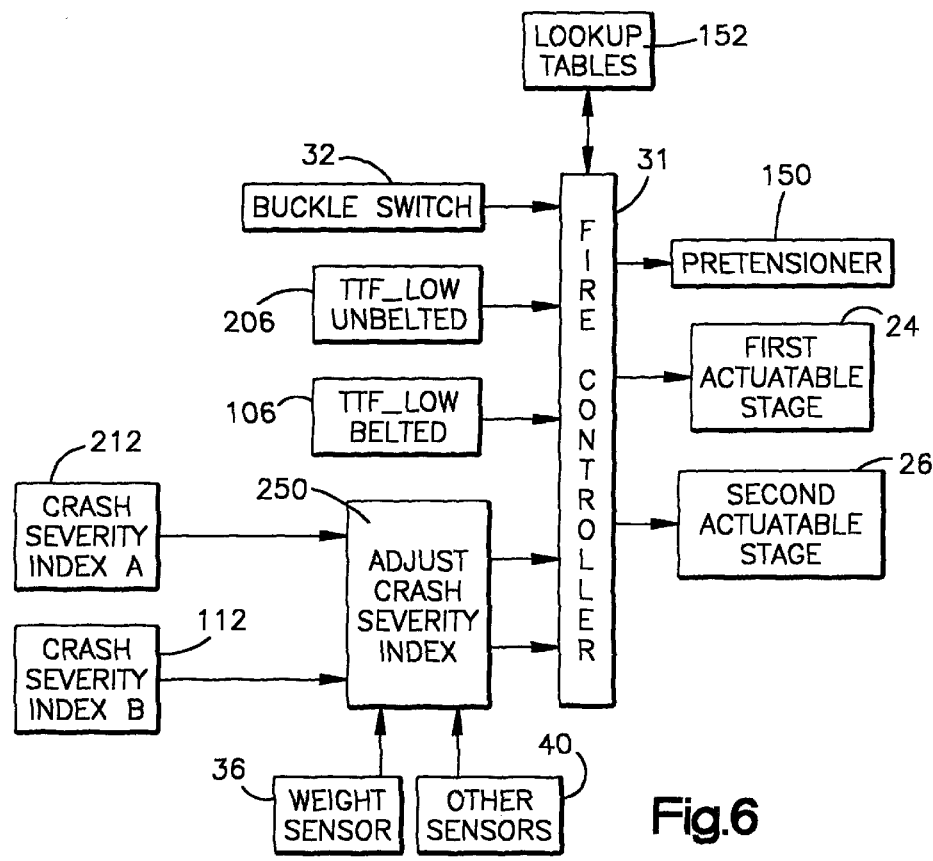
FIG. 6 is a functional block diagram of yet another portion of the system of FIG. 1.

Referring to FIG. 6, the crash severity index A 212 and the crash severity index B 112 are connected to an adjustment function 250. The adjustment function 250 receives further input signals from the occupant weight sensor 36 and from the other sensors 40 mentioned above. The adjustment function 250 adjusts the crash severity index values A or B in response to the sensors 36, 40. Depending on the sensed weight of the occupant and other sensed characteristics or attributes, the index values A, B will be increased, decreased, or left without further adjustment. The adjusted crash severity index values are passed to the fire controller 31. The fire controller 31 immediately actuates the first actuatable stage 24 when either the TTF_LOW unbelted 206 (if the buckle switch is open) or the TTF_LOW belted 106 (if the buckle switch is closed) functions indicate a deployment crash event, i.e., 206 or 106 are switched HIGH.

If the restraint system includes a pretensioner 150, then the pretensioner is actuated at TTF-LOW unbelted 206 HIGH if the buckle switch output is closed, i.e., the occupant is belted. The fire controller 31 further controls the actuation of the second stage 26 in response to the value of the adjusted crash severity index A 212 if buckle switch 32 is open (i.e., an unbelted occupant is detected). The fire controller 31 controls actuation of the second stage 26 in response to the adjusted crash severity index B 112 if the buckle switch 32 indicates a belted occupant condition. Based on the value of the appropriate adjusted crash severity index A or B (depending on the belted condition of the occupant), the controller 31 looks up a fire control value in the look-up table 152. The look-up table 152 has stored fire values for control of the second stage deployment in response to the appropriate crash severity index value. These stored values are determined through empirical methods for a particular vehicle platform of interest.

The control of the second stage 26 is further in response to the particular type of inflator used for a particular vehicle. This "inflator type" data can be entered to the fire controller 31 through an appropriate one of the sensors 40 or can be stored as part of the look-up tables 152. In this way, the deployment of the second stage 26 could be advanced or retarded in response to the inflator type. For example, one vehicle may require series activation within 5 msec. to achieve 100% inflation. Another vehicle may require series activation within 7 msec. to achieve 100% inflation because of a difference in inflator type. These differences can be accounted for by the fire controller 31. This further adjustment in response to inflator type is referred to as translation. Translation is accomplished by a translator function within the controller 22.

Referring to FIG. 7, a chart is depicted showing the effects of the crash severity index according to the present invention. The column on the left shows the particular types of crash events for a selected vehicle platform. Assume for this example shown, that full inflation is achieved if both stages are actuated 5 msec. apart, an intermediate inflation occurs if the two stages are actuated 20 msec. apart, and a lowest inflation level occurs if only one stage (e.g., the primary stage) is actuated. The first crash event is a 40 KPH (kilometers per hour) head-on (0 deg.) into a barrier. If the occupant is unbelted, the second stage is actuated 20 msec. after the first stage. If the occupant is belted, the second stage is not actuated. In the second example, the crash event is a 40 KPH crash into an offset deformable barrier ("ODB"). If the occupant is unbelted, only the primary stage is actuated. If the occupant is belted, no actuation of either stage occurs. In the third example, the crash event is a 48 KPH 0 deg. Barrier event. If the occupant is unbelted, the second stage is actuated 5 msec. after the first stage is actuated. If the occupant is belted, the second stage is actuated 20 msec. after the first stage actuation. This example clearly shows the effect of the different crash severity indexes for a belted and unbelted occupant.

The fourth example is a 48 KPH oblique (30 deg.) crash into a barrier. If the occupant was unbelted, the second stage is actuated 20 msec. after the first stage actuation. If the occupant was belted, only the primary stage is actuated. In the fifth example, the crash event is a 48 KPH crash into a pole. If the occupant is belted or unbelted, the second stage is actuated 20 msec. after the first stage actuation. In the sixth example, the crash event is a 56 KPH 0 deg. barrier event. In this case, the second stage is actuated 5 msec. after the first stage actuation whether the occupant is belted or not. In the seventh case, the crash event is a 56 KPH ODB crash. If the occupant is unbelted, the second stage is actuated 20 msec. after the first stage actuation. If the occupant is belted, only the primary stage is actuated. In the eighth example, the crash event is a 64 KPH ODB event. If the occupant is unbelted, the second stage is actuated 5 msec. after the first stage is actuated. If the occupant is belted, the second stage is actuated 20 msec. after the first stage is actuated.

In the examples shown in FIG. 7 and described above, the crash severity indexes for the unbelted occupant condition provides three different controls for the listed crash events, i.e., primary only, a 5 msec. delay, and a 20 msec. delay. The crash severity index for the belted occupant condition provides four different controls for the listed crash events, i.e., no fire of either stage, primary only, a 5 msec. delay, and a 20 msec. delay. Those skilled in the art will appreciate that the crash severity indexes do not have to be divided into discrete crash levels. The amount of divisions and the possible control levels depends on the number of actuators and a desired control of inflation fluid into the air bag. Bleeder valves could be used to provide an "infinite" control between a low inflation level and full inflation level.

The categorization of the types of vehicle crash events shown in the example of FIG. 7 is in response to the determined velocity values 74 and 174 and the safing function is in response to the determined velocity values and associated determined displacement values. Other crash metrics could be used to categorize the different crash events and to control the safing function. In accordance with the preferred embodiment, the crash severity index values A and B are based on the $\Delta t$ for crossing of thresholds. If the $\Delta t$ is greater than a first value, only the primary is actuated. If the $\Delta t$ is between the first value and a second value, the second stage is actuated 20 msec. after the first stage. If the $\Delta t$ is less than the second value, the second stage is actuated 5 msec. after the first stage. The first and second values are dependent upon inflator type.

Figure 8A:
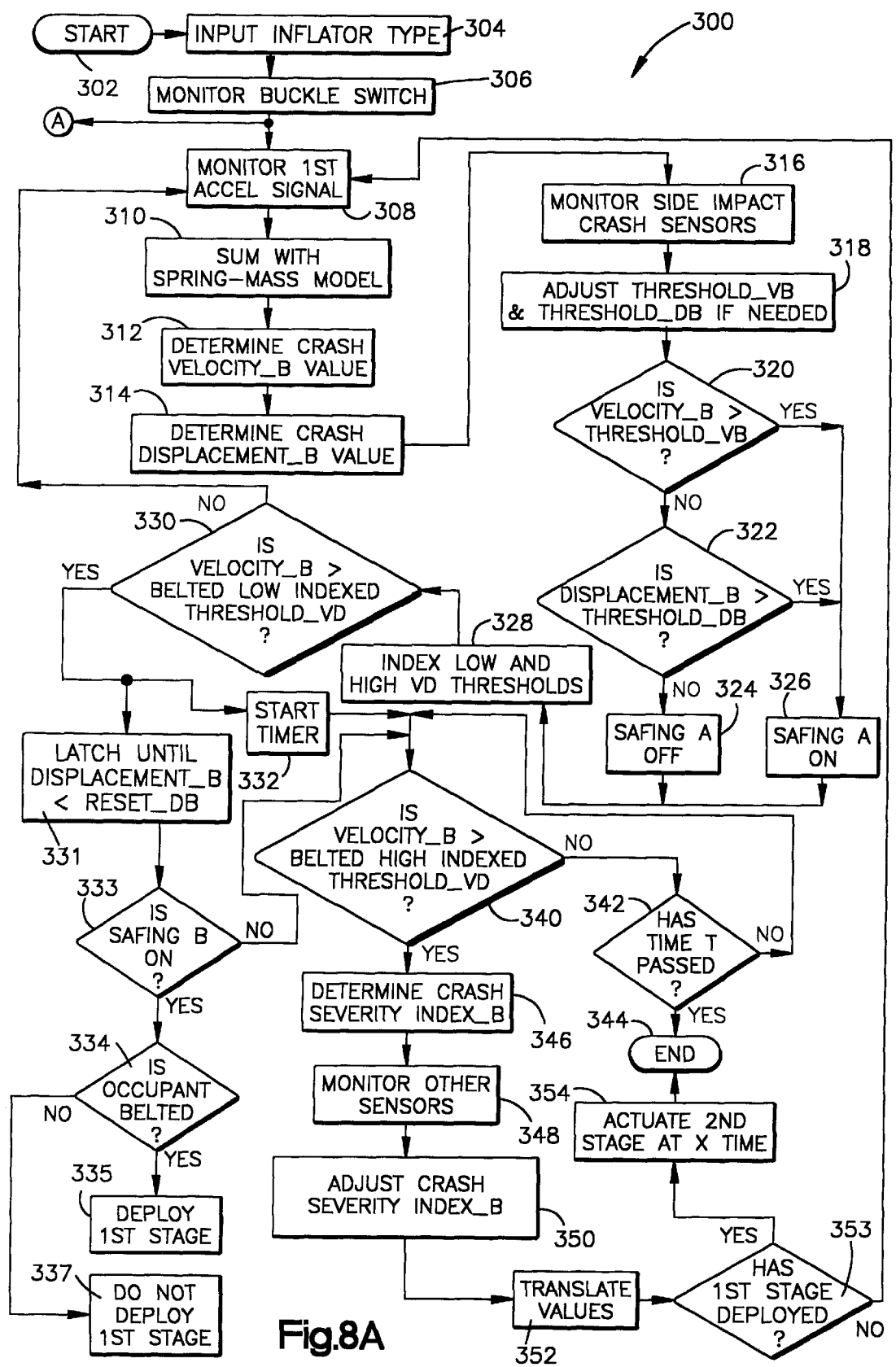
FIGS. 8A–8B are flow diagrams showing control processes in accordance with the present invention.
Figure 8B:
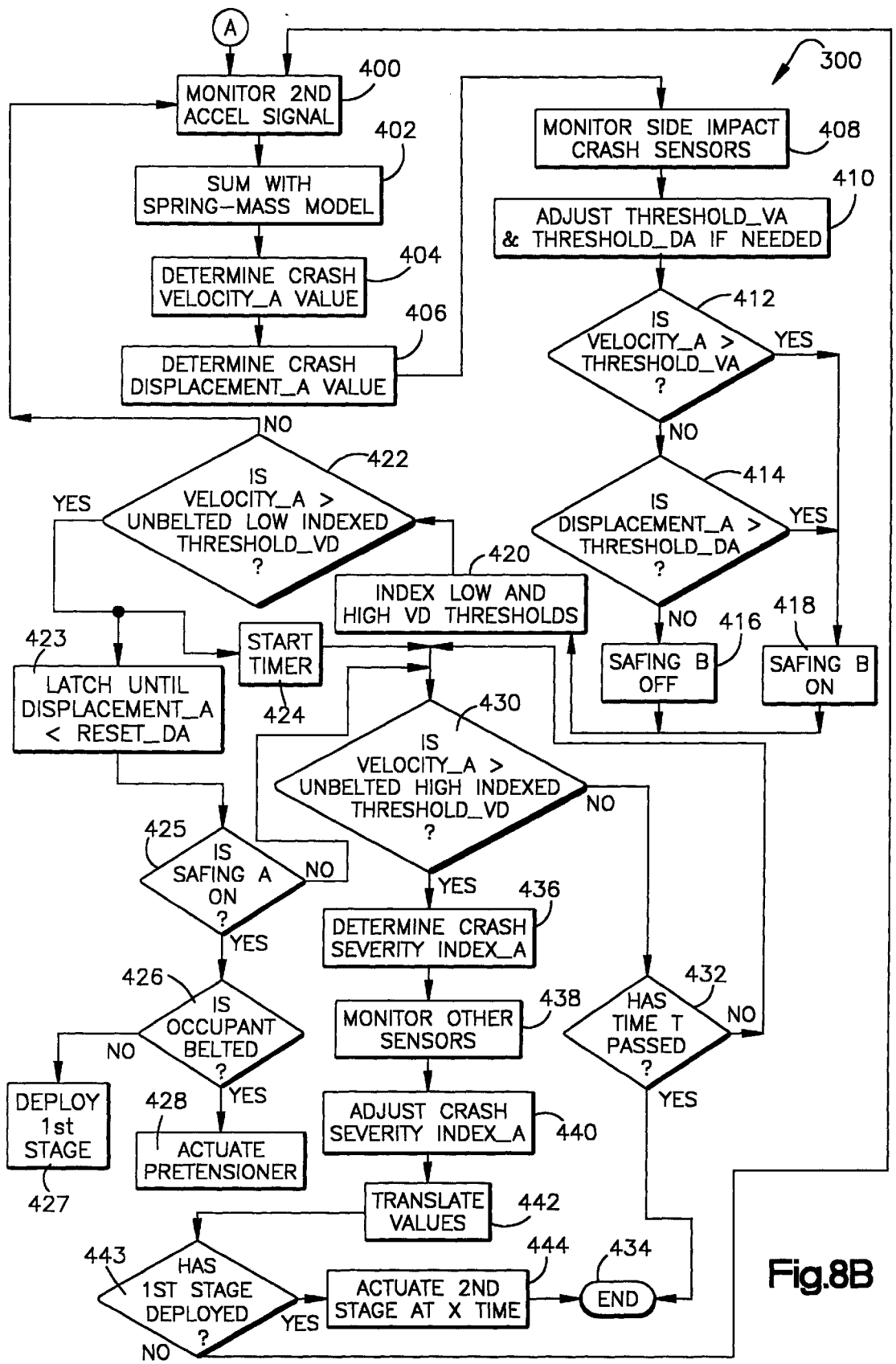

Referring to FIGS. 8A and 8B, a control process 300, in accordance with a preferred embodiment of the present invention, will be appreciated. The flow charts show parallel processing. Those skilled in the art will appreciate that programming steps are sequential but can be shown in a flow chart as parallel. The actual sequence of the steps may vary from that shown and described.

The process starts with step 302 which is an initialization step in which memories are cleared, flags are set to initial conditions, etc., as is well known in the art. In step 304, initial data is input regarding the specific type of inflator used with the actuatable restraint system of the present invention. As mentioned, the amount of inflation is a function of the particular type of inflator being used. For example, in a first type of air bag assembly, the actuation of a first stage could provide a 40% inflation and a 100% inflation if the second stage is actuated within x msec. of the first. Another type of inflator could provide a 40% inflation upon actuation of the first and a 100% inflation if the second is actuated with x+y msec. of the first. This information can be provided by storage in a read-only-memory, through the other sensors 40, or accounted for in the values stored in the look-up table 152.

The process proceeds to step 306 where the buckle switch 32 is monitored. The process proceeds to step 308 and to step 400. In step 308, the first acceleration signal 18 is monitored from the first acceleration sensor 14. In step 310, the monitored acceleration signal is summed with the spring-mass model values. As previously mentioned, the initial values for the spring force and viscous damping values are set to zero. The values change as the acceleration changes. In step 312, the velocity value for the belted occupant condition is determined by integration of the adjusted acceleration signal. In step 314, the displacement value for the belted occupant condition is determined through integration. The process proceeds to step 316 where the side impact crash sensors 28 are monitored. Although, the steps 308–316 are only mentioned once, it is to be understood that these steps are performed periodically during the operation of the vehicle.

In step 318, the threshold values 124 and 132 are adjusted if necessary in response to the monitored side impact. If there is no side impact sensed, the threshold values will assume a default value established through empirical testing. The process proceeds to step 320 where a determination is made as to whether the determined velocity value 74 is greater than the threshold value 132. If the determination is negative, there is a determination made as to whether the displacement value 78 is greater than the threshold value 124 in step 322. If the determination in step 322 is negative, the safing function A is either turned OFF or is held OFF, i.e., a digital LOW, in step 324. The initial flag setting for the safing function A would be OFF. If an affirmative determination is made in either steps 320 or 322, the safing function A would be set ON, i.e., a digital HIGH, in step 326.

From either steps 324 or 326, the process proceeds to step 328 were the low and high VD threshold values 84, 86 are indexed 82 according to the determined displacement value 80. As the displacement value 80 changes, the velocity low and high threshold values 84, 86 will change. The relationship of this indexed value is determined according to empirical methods for a particular vehicle platform so as to provide a desired discrimination of crash events.

In step 330, a determination is made as to whether the determined velocity value 74 is greater than the low, belted velocity threshold value 84. If the termination is negative, the process loops back to step 308 since no deployment crash event is occurring. If the determination is affirmative, a HIGH or TRUE is latched in latch 94 in step 331 and the timer 110 is started in step 332. The value remains latched until the value of the displacement 80 is less than a predetermined reset value. The process proceeds from step 331 to step 333 where it is determined if the safing function B is ON. The safing function B initial state is set OFF and can be turned ON (digital HIGH) as described below. If the safing function B is OFF (digital LOW) the process loops to step 340.

If the determination in step 333 is affirmative, i.e., safing function B is ON, the process proceeds to step 334 where a determination is made as to whether the occupant is belted. If the determination is affirmative, the process proceeds to actuate the first stage in step 335. If the determination is negative, the first stage is not actuated, shown as step 337.

After the timer is started in step 332, the process proceeds to step 340 where a determination is made as to whether the velocity value 74 determined for the belted occupant exceeds the HIGH_THRESHOLD_VD value 86. If the determination is negative, the process proceeds to step 342 where an inquire is made as to whether a predetermined amount of time, T, has timed out by timer 110.

As mentioned, crash severity is a measure of time Δt, between when the crash velocity passes through threshold 84 and the threshold 86. If the amount of time exceeds a predetermined value "T", then the crash is not severe enough to result in actuation of the second stage. The value T is determined for a particular vehicle platform through empirical methods. If the determination in step 342 is negative, the process loops back to step 340. If the determination in step 342 is affirmative, meaning that the LOW threshold 84 was exceeded but the HIGH threshold 86 was not exceed within the time period T, the program "ends" with step 344. Under these conditions, only the first stage 24 was actuated, and because the crash intensity was not large enough, the second stage 26 was not actuated.

If the determination in step 340 is affirmative, meaning the HIGH threshold 86 was exceeded by the determined velocity value, the belted crash severity index B for the belted occupant is determined in step 346. Preferably, the controller 22 uses the look-up table 152. The controller "knows" the amount of time Δt from when the LOW belted threshold 84 was exceeded to the time when the HIGH belted threshold 86 was exceeded. Fire control values are stored in the look-up table 152 as a function of the value of Δt. These stored values are in terms of deployment times relative to the deployment of the first stage. The crash severity index B may be adjusted. To accomplish this adjustment, other sensors of the system are monitored in step 348. These other sensors include the weight sensor 36 plus any additional sensor 40 such as occupant position, occupant size, etc. The value is adjusted in step 350. As those skilled in the art will appreciate, the second stage 26 is actuated in response to not only the crash intensity but, also, in response to sensed or programmed occupant characteristics.

The adjusted crash severity index B for the belted occupant from step 350 is subjected to translation so as to account for the particular inflator system used and/or for vehicle type. As mentioned earlier, the system of the present invention may be used with systems having different types of inflators. These differences are normalized by use of the translate step 352 using manufacture's specifications and/or empirical testing date.

The process then proceeds to step 353 where a determination is made as to whether the first stage (belted) has been actuated. If the determination is negative, the process loops back to step 308. If the determination in step 353 is affirmative, the second stage is actuated in step 354 at a time X (output of step 352) after the first stage actuation. The process would "end" with step 344.

In step 400, the second acceleration signal 20 is monitored from the second acceleration sensor 16. In step 402, the monitored acceleration signal is summed with the spring-mass model values 158, 162. As previously mentioned, the initial values for the spring force and viscous damping values are set to zero. The values change as the acceleration changes. In step 404, the velocity value for the unbelted occupant condition is determined by the integration function 172. In step 406, the determined displacement value for the unbelted occupant condition is determined by the integration function 178. The process proceeds to step 408 where the side impact crash sensors 28 are monitored. Although, the steps 400–408 are only mentioned once, it is to be understood that these steps are performed periodically during the operation of the vehicle.

In step 410, the threshold values 224 and 232 are adjusted if necessary. If there is no side impact sensed, the threshold values will assume a default value established through empirical testing. The process proceeds to step 412 where a determination is made as to whether the determined velocity value 174 is greater than the threshold value 232. If the determination is negative, there is a determination made as to whether the displacement value 180 is greater than the threshold value 224 in step 414. If the determination in step 414 is negative, the safing function B is either turned OFF or is held OFF, i.e., a digital LOW. The initial flag setting for the safing function B would be OFF. If an affirmative determination is made in either steps 412 or 414, the safing function B would be set ON, i.e., a digital HIGH. This safing function B state was used back in the determination made in step 333.

From either steps 416 or 418, the process proceeds to step 420 were the low and high VD threshold values 184, 186 are indexed according to the determined displacement value 180. As the displacement value 180 changes, the velocity threshold values 184, 186 will change. The relationship of this indexed value is determined according to empirical methods for a particular vehicle platform so as to provide a desired discrimination of crash events.

In step 422, a determination is made as to whether the determined velocity value 174 is greater than the low, unbelted velocity threshold value 184. If the determination is negative, the process loops back to step 400 since no deployment crash event is occurring. If the determination is affirmative, a HIGH or TRUE is latched in latch 423 and the timer 210 is started in step 424. The value remains latched until the value of the displacement 180 is less than a predetermined value. The process proceeds from step 423 to step 425 where it is determined if the safing function A is ON. The state of safing function A is controlled in steps 324, 326 as described above. The safing A initial state is set OFF and can be turned ON as described. If the safing function A of OFF (digital LOW), the process loops to step 430.

If the determination in step 425 is affirmative, i.e., safing function A is ON, the process proceeds to step 426 where a determination is made as to whether the occupant is belted. If the determination is negative, the first stage is deployed in step 427. If the determination in step 426 is affirmative, the pretensioner 150 is actuated in step 428.

From step 424, the process proceeds to step 430 where a determination is made as to whether the velocity value 174 determined for the unbelted occupant exceeds the HIGH_ THRESHOLD_VD value 186. If the determination is negative, the process proceeds to step 432 where a determination is made as to whether a predetermined amount of time, T, has timed out by timer 110. If the determination in step 432 is negative, the process loops back to step 430. If the determination in step 432 is affirmative, meaning that the LOW threshold 184 was exceeded but the HIGH threshold 186 was not exceed within the time period T, the program "ends" with step 434. Under these conditions, only the first stage 24 was actuated and because the crash intensity was not large enough, the second stage was not actuated.

If the determination in step 430 is affirmative, meaning the HIGH threshold 186 was exceeded by the determined velocity value, the unbelted crash severity index A for the unbelted occupant is determined in step 436. Preferably, the controller uses the look-up table 152. The controller "knows" the amount of time Δt from then the LOW unbelted threshold 184 was exceed to the time when the HIGH unbelted threshold 186 was exceed. Values are stored in the look-up table 152 as a function of the value of Δt. This determined crash severity index A may be adjusted. To accomplish this adjustment, other sensors of the system are monitored in step 438. These other sensors include the weight sensor 36 plus any additional sensor 40 such as occupant position, occupant size, etc. The value is adjusted in step 440. As those skilled in the art will appreciate, the second stage 26 is actuated in response to not only the crash intensity but, also, in response to occupant characteristics.

The adjusted crash severity index for the unbelted occupant from step 440 is subjected to translation (i.e., further adjustment) so as to account for the particular inflator system used and/or for vehicle type. As mentioned earlier, all inflators are not equal nor their operation the same. These differences are normalized by use of the translation step 442 using manufacture's specifications and/or empirical testing. Values necessary for the translation are stored in look-up tables 152 or are input to controller 22 through other means such as an appropriate sensor 40.

The process then proceeds to step 443 where it is determined whether the first stage (unbelted) has deployed. If the determination is negative, the process loops back to step 400. If the determination in step 443 is affirmative, the process proceeds to step 444 where the second stage is actuated at a time X (output of step 442) after the first stage actuation. The process would "end" with step 434.

Referring to FIGS. 9A and 9B, a 14 MPH barrier crash is depicted for a vehicle having a belted occupant. FIG. 9A depicts the determination of the safing function B 101 in FIG. 5. When the displacement threshold is crossed, the safing function B turns ON (a digital HIGH). The graph in FIG. 9B depicts the control process shown in FIG. 2. It should be noticed that the velocity vs. displacement curve never crosses the low nor high thresholds 84, 86, respectively. Therefore, there would be no deployment of the air bag since neither of the stages is actuated.

Figure 10A:
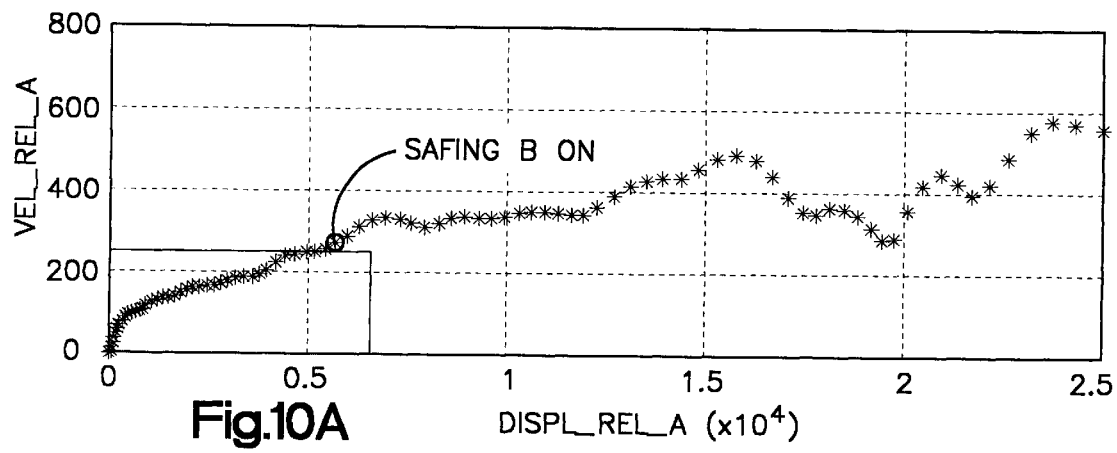
Figure 10B:
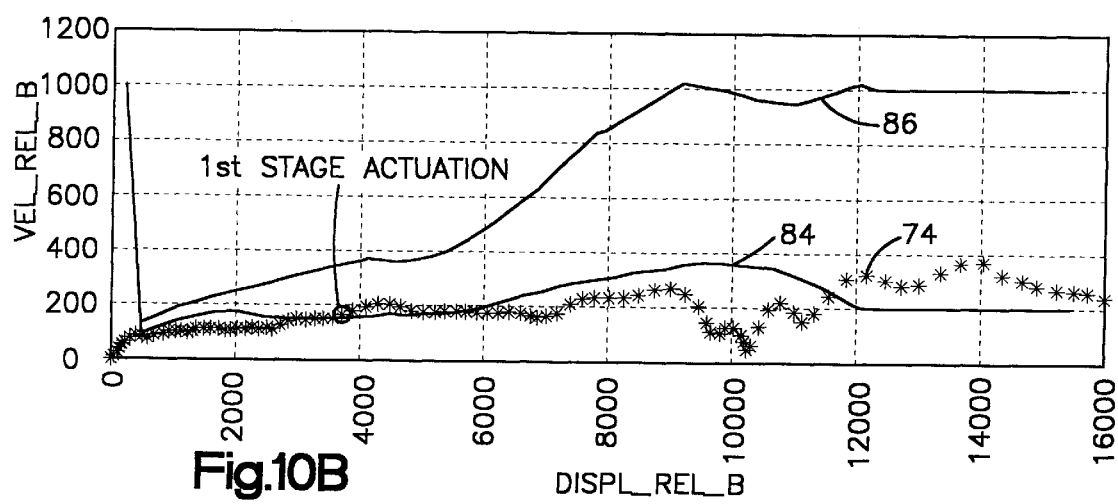

Referring to FIGS. 10A and 10B, a 19 MPH barrier crash is depicted for a vehicle having a belted occupant. FIG. 10A depicts the determination of the safing function B 101 in FIG. 5. When the velocity threshold is crossed, the safing function B turns ON (a digital HIGH). The graph in FIG. 10B depicts the control process shown in FIG. 2. It should be noticed that the velocity vs. displacement curve crosses only the low threshold 84. Since the safing B is on, the first stage only is actuated. The second stage is not actuated because the high threshold is never crossed.

FIGS. 11A and 11B, a 30 MPH barrier crash is depicted for a vehicle with a belted occupant. FIG. 11A depicts the determination of the safing function B 101 in FIG. 5. When the velocity threshold is crossed, the safing function B turns ON (a digital HIGH). The graph in FIG. 11B depicts the control process shown in FIG. 2. It should be noticed that the velocity vs. displacement curve crosses the first threshold 84. If the safing B is ON, the first stage is actuated. The second threshold is also eventually crossed. If this crossing occurs before the time T being time out by timer 110, the second stage will be actuated in response to the determined crash severity index 112.

Figure 12A:
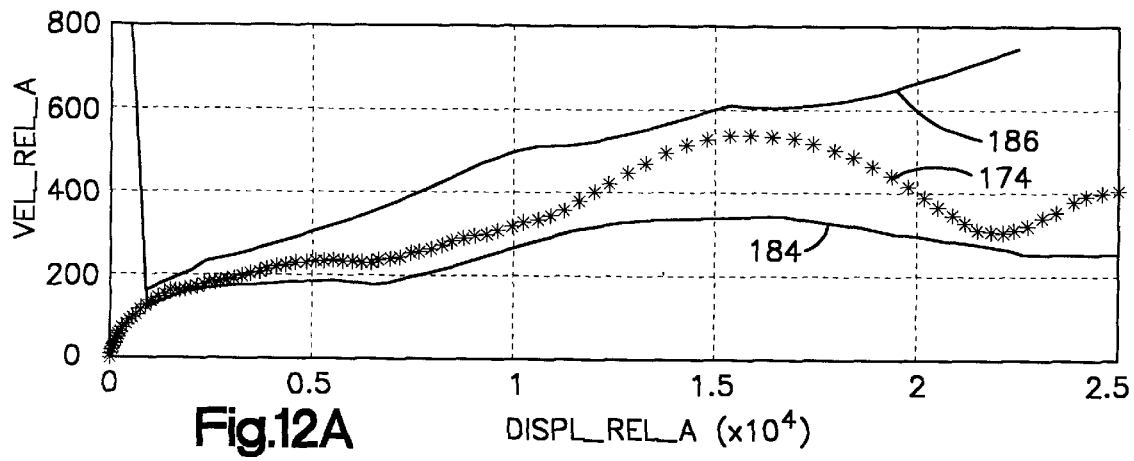
Figure 12B:
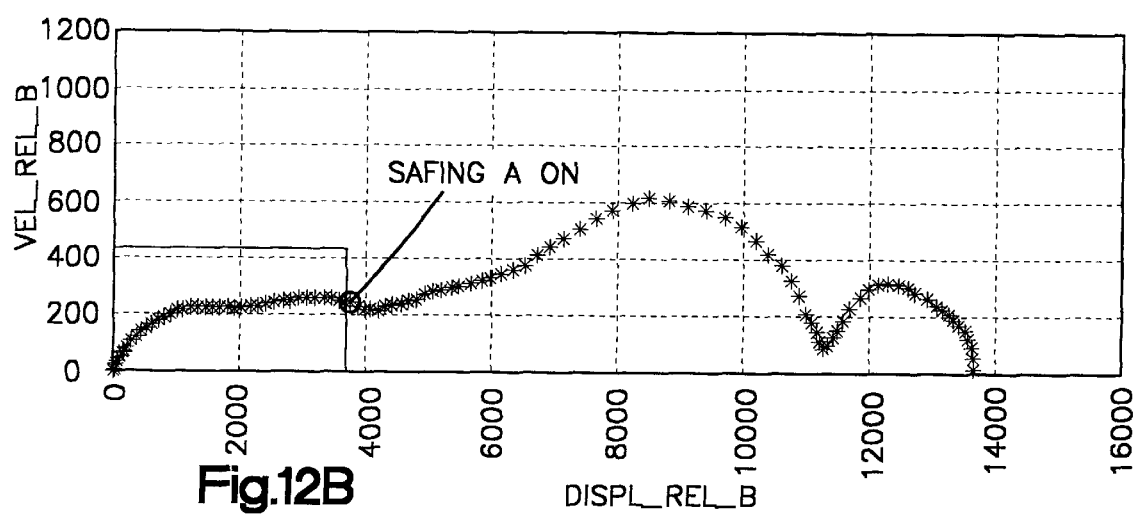

Referring to FIGS. 12A and 12B, a 14 MPH barrier crash is depicted for a vehicle with an unbelted occupant. FIG.

12B depicts the determination of the safing function A 136 in FIG. 2. When the displacement threshold is crossed, the safing function A turns ON (a digital HIGH). The graph in FIG. 12A depicts the control process shown in FIG. 5. It should be noticed that the velocity vs. displacement curve crosses the low threshold 184 but not the upper threshold 186. Therefore, only the first stage would be actuated. Compared to the graph depicted in FIGS. 9A and 9B, the first stage is actuated in an unbelted condition but not in a belted condition.

Figure 13A:
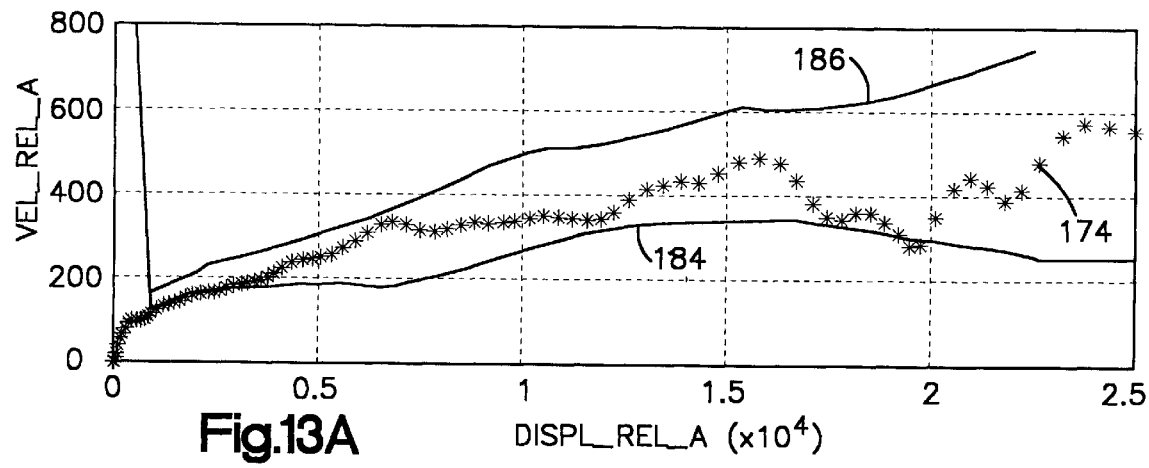
Figure 13B:
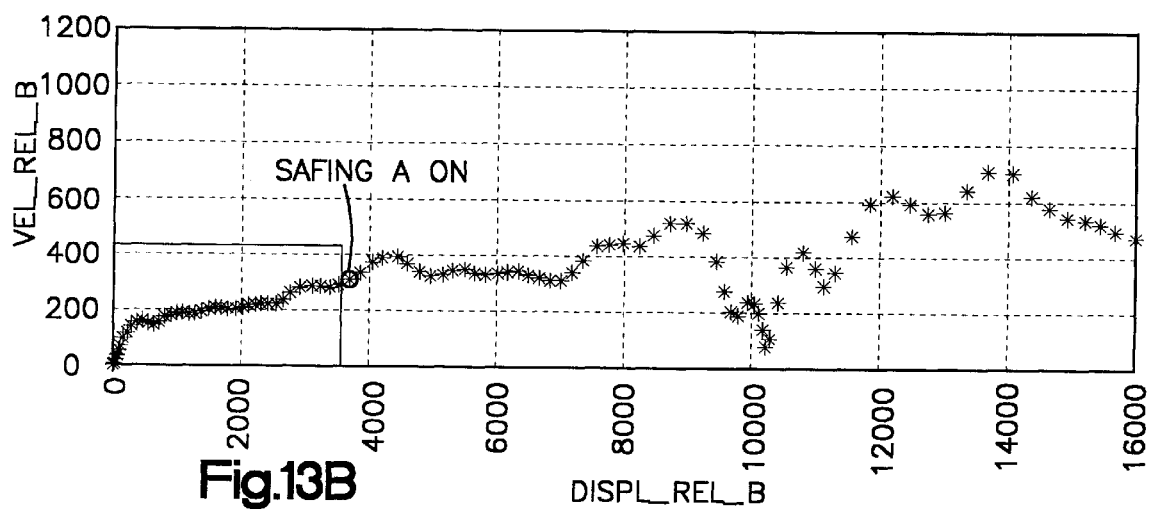

Referring to FIGS. 13A and 13B, a 20 MPH barrier crash is depicted for a vehicle having an unbelted occupant. FIG. 13B depicts the determination of the safing function A 136 in FIG. 2. When the displacement threshold is crossed, the safing function A turns ON (a digital HIGH). The graph in FIG. 13A depicts the control process shown in FIG. 5. It should be noticed that the velocity vs. displacement curve crosses only the low threshold 184. If the safing A is ON, the first stage only is actuated. The second stage is not actuated because the high threshold 186 is never crossed.

Figure 14A:
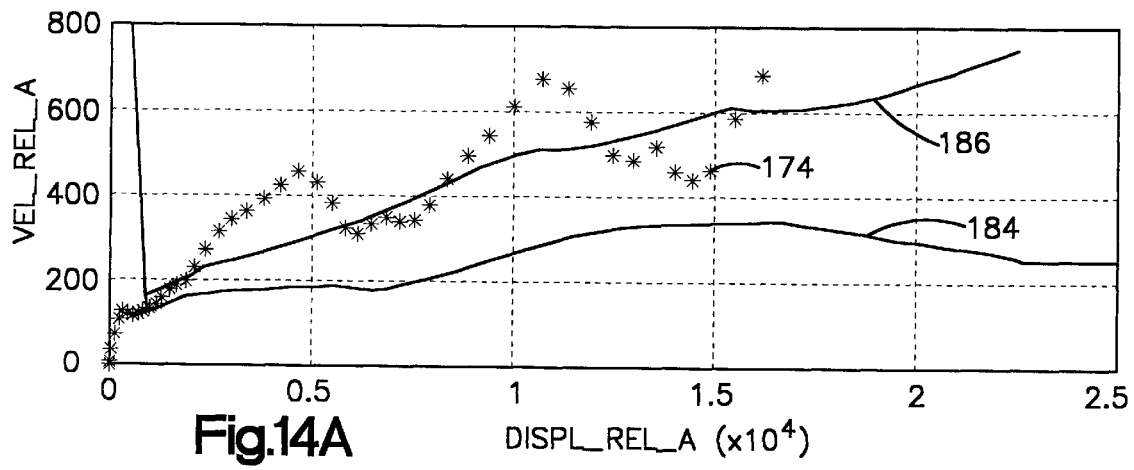
Figure 14B:
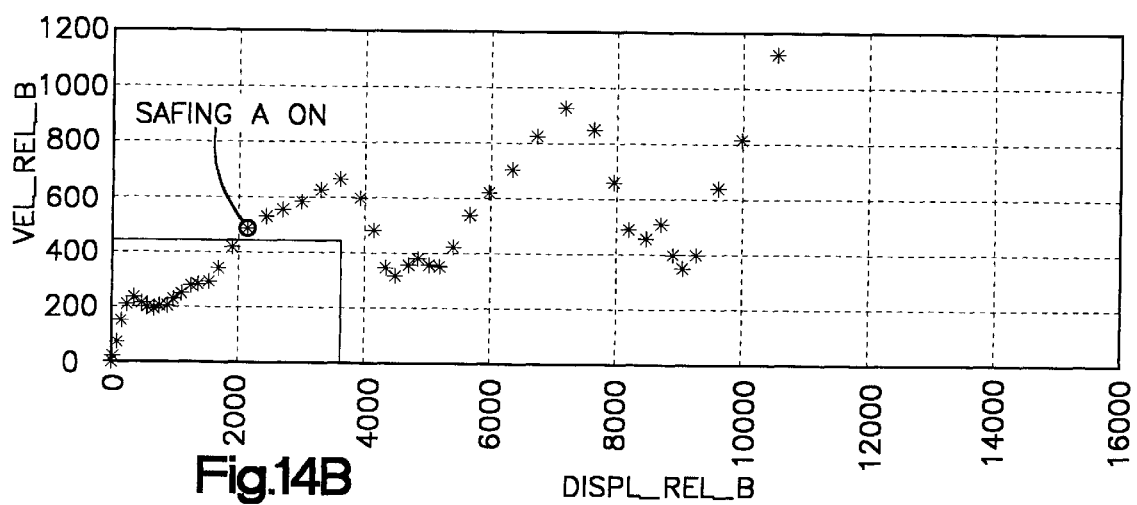

FIGS. 14A and 14B, a 30 MPH barrier crash is depicted for a vehicle having an unbelted occupant. FIG. 14B depicts the determination of the safing function A 136 in FIG. 2. When the velocity threshold is crossed, the safing function A turns ON (a digital HIGH). The graph in FIG. 14A depicts the control process shown in FIG. 5. It should be noticed that the velocity vs. displacement curve crosses the first threshold 184. If the safing B is ON, the first stage is actuated. The second threshold is also crossed. If this crossing occurs before the time T being timed out by timer 210, the second stage will be actuated in response to the determined crash severity index 212.

From the above description of the invention, those skilled in the art will perceive improvements, changes and modifications. For example, the safing functions 136, 101 were described as being determined from a crash acceleration signal. These safing functions, in their simplest form could be achieved using a mechanical switch. Such a mechanical switch arrangement would not permit the variable threshold feature permitted with the described embodiment. Such improvements, changes and modifications within the skill of the art are intended to be covered by the appended claims.

Having described the invention, the following is claimed:

1. An apparatus for controlling an actuatable occupant restraint device for a vehicle, said restraining device having a plurality of actuatable stages, said apparatus comprising:

crash sensing means for sensing crash acceleration and providing a crash acceleration signal indicative thereof;

velocity determining means responsive to said crash acceleration signal for determining a velocity value and providing a velocity signal indicative thereof;

control means coupled to said actuatable device for (i) effecting actuation of a first of said actuatable stages when said determined velocity value exceeds a first threshold value, and (ii) upon said determined velocity value exceeding a second threshold value, determining a crash severity index having a value related to a time interval from when said determined velocity value exceeds said first threshold value to when said determined velocity value exceeds said second threshold value, said control means controlling actuation of a second of said actuatable stages in response to said crash severity index value.

2. The apparatus of claim 1 wherein said control means further comprises a plurality of selectable crash metrics responsive to said velocity signal for controlling actuation of said actuatable occupant restraint device in response to a selected crash metric, each of said crash metrics having associated first and second variable threshold values.

3. The apparatus of claim 2 wherein each of said crash metrics corresponds to an associated predetermined occupant profile and wherein said apparatus further comprises sensing means for sensing whether an occupant is belted or unbelted, said control means selecting one of said crash metrics in response to whether the occupant is sensed to be belted or unbelted.

4. The apparatus of claim 2 further comprising:

a switching device for providing a signal indicative of a belted or unbelted vehicle occupant condition, and said control means selecting a crash metric in response to said switching device signal, said control means controlling actuation of said plurality of stages in response to said selected crash metric.

5. The apparatus of claim 2 further comprising a processing means for processing said crash acceleration signal based upon a spring-mass model to provide an adjusted crash acceleration signal, said velocity determining means determining said velocity value in response to said adjusted crash acceleration signal.

6. The apparatus of claim 5 wherein said spring-mass model is based upon a belted vehicle occupant.

7. The apparatus of claim 5 wherein said spring-mass model is based upon an unbelted vehicle occupant.

8. The apparatus of claim 2 wherein said crash sensing means further comprises at least a first and a second acceleration sensor, said first acceleration sensor being associated with a first of said crash metrics and said second acceleration sensor being associated with a second of said crash metrics.

9. The apparatus of claim 8 wherein each of said crash metrics comprises an associated safing control for enabling or disabling actuation of said plurality of actuatable stages, a first safing control associated with said first crash metric being responsive to said second acceleration sensor and a second safing control associated with said second crash metric being responsive to said first acceleration sensor.

10. The apparatus of claim 2 further comprising a switch for detecting a belted or unbelted occupant condition and providing a signal indicative of said detected occupant condition, actuation of said first and second actuatable stages being responsive to said switch signal.

11. The apparatus of claim 10 further comprising a seat belt pretensioning restraint device responsive to said switch signal.

12. The apparatus of claim 1 further comprising a safing means for disabling and enabling actuation of said plurality of actuatable stages in response to crash acceleration.

13. The apparatus of claim 12 further comprising a side impact sensor for sensing a side impact crash event and providing a signal indicative thereof, said safing means being further responsive to said side impact crash signal.

14. The apparatus of claim 12 wherein said apparatus further includes second crash sensing means for providing a second crash acceleration signal, said safing means disabling and enabling said actuation in response to said second crash acceleration signal.

15. The apparatus of claim 12 wherein said safing means includes a mechanical safing switch that changes a switching state in response to said crash acceleration.

16. The apparatus of claim 1 where in said control means further includes displacement determining means for determining an occupant displacement value in response to said crash acceleration signal, said control means being responsive to said occupant displacement value for control of said actuatable stages.

17. The apparatus of claim 16 wherein said first and second threshold values are functionally related to said determined displacement value.

18. The apparatus of claim 1 further comprising a weight sensor for sensing the weight of a vehicle occupant and providing a signal indicative thereof, and wherein said control means further comprises means for adjusting said crash severity index value in response to said occupant weight signal.

19. The apparatus of claim 1 wherein said restraint device is a multi-stage air bag and wherein said crash severity index value is adjusted according to type of inflators used with said air bag.

20. An apparatus for controlling an actuatable occupant restraint device having a plurality of actuatable stages, said apparatus comprising:

a crash sensor for sensing crash acceleration and providing a crash acceleration signal indicative thereof;

a velocity determiner responsive to said crash acceleration signal for determining a velocity value and providing a velocity signal indicative thereof;

first and second actuatable stages; and a controller operatively coupled to said first and second actuatable stages, said controller effecting actuation of said first actuatable stage upon said determined velocity value exceeding a first threshold value, and said controller determining a crash severity index having a value according to a time interval from when said determined velocity value exceeds said first threshold value to when said determined velocity value exceeds a second threshold value, said controller effecting actuation of said second actuatable stage in response to said crash severity index value.

21. The apparatus of claim 20 wherein said controller comprises a memory preprogrammed with a plurality of selectable crash metrics responsive to said determined velocity signal for controlling actuation of said actuatable stages, each of said crash metrics having associated first and second variable threshold values.

22. The apparatus of claim 21 wherein each of said crash metrics corresponds to a predetermined occupant profile.

23. The apparatus of claim 22 further comprising a switch for detecting a belted or unbelted occupant condition and providing a signal indicative of said detected occupant condition, actuation of said first and second actuatable stages being responsive to said switch signal.

24. The apparatus of claim 23 further comprising a seat belt pretensioning restraint device responsive to said switch signal.

25. The apparatus of claim 20 further comprising an acceleration responsive safing switch for disabling and enabling actuation of said first and second actuatable stages in response to crash acceleration.

26. A method for controlling actuation of an actuatable occupant restraint device having a plurality of stages, said method comprising the steps of:

sensing crash acceleration and providing a crash acceleration signal indicative thereof;

determining a velocity value in response to said crash acceleration signal;

effecting actuation of a first of said actuatable stages upon said determined velocity value exceeding a first threshold value;

determining, upon said velocity value exceeding a second threshold value, a crash severity index having a value according to a time interval from when said determined velocity value exceeds said first threshold value to when said determined velocity value exceeds said second threshold value; and effecting actuation of a second of said actuatable stages in response to said crash severity index value.

27. The method of claim 26 further comprising the steps of:

processing said crash acceleration signal based upon a spring-mass model of a vehicle occupant;

providing an adjusted crash acceleration signal based upon said spring-mass model, and determining said velocity value in response to said adjusted crash acceleration signal.

28. The method of claim 26 further comprising the step of providing a signal indicative of an occupant being belted or unbelted.

29. The method of claim 26 further comprising the steps of:

sensing weight of a vehicle occupant, and providing a signal indicative the sensed occupant weight.

30. The method of claim 29 further comprising the step of adjusting said crash severity index value in response to said occupant weight signal.

31. The method of claim 26 further comprising the steps of:

sensing a safing crash acceleration and providing a safing crash acceleration signal indicative thereof;

providing a safing crash signal when said safing crash acceleration indicates a deployment crash event; and enabling and disabling said actuatable restraint device in response to said safing crash acceleration signal.

32. The apparatus of claim 31 wherein said step of providing said safing crash signal further comprises the steps of:

comparing a crash velocity value against a first threshold value;

comparing a crash displacement value against a second threshold value; and providing said safing crash acceleration signal when either said crash displacement value is greater than said second threshold or said crash velocity value is greater than said first threshold.

33. The method of claim 32 further comprising the steps of:

sensing transverse crash acceleration; and varying the value of said first threshold value and said second threshold value in response to said sensed transverse acceleration.

* * * * *